United States Patent
Huse

(10) Patent No.: US 11,625,357 B2
(45) Date of Patent: Apr. 11, 2023

(54) CONTROL OF DATA TRANSFER BETWEEN PROCESSORS

(71) Applicant: Graphcore Limited, Bristol (GB)

(72) Inventor: Lars Paul Huse, Oppegard (NO)

(73) Assignee: GRAPHCORE LIMITED, Bristol (GB)

(*) Notice: Subject to any disclaimer, the term of this patent is extended or adjusted under 35 U.S.C. 154(b) by 78 days.

(21) Appl. No.: 16/844,314

(22) Filed: Apr. 9, 2020

(65) Prior Publication Data
US 2021/0216321 A1   Jul. 15, 2021

(30) Foreign Application Priority Data
Jan. 15, 2020 (GB) .................................. 2000587

(51) Int. Cl.
*G06F 15/173* (2006.01)

(52) U.S. Cl.
CPC .............................. *G06F 15/17318* (2013.01)

(58) Field of Classification Search
CPC ... G06F 15/17318; G06F 15/167; G06N 3/08; G06N 3/04; H04L 47/621
See application file for complete search history.

(56) References Cited

U.S. PATENT DOCUMENTS

| | | | | |
|---|---|---|---|---|
| 7,734,894 | B1* | 6/2010 | Wentzlaff ................ | G06F 15/16 712/15 |
| 2018/0322386 | A1* | 11/2018 | Sridharan .............. | G06N 3/063 |
| 2019/0339939 | A1* | 11/2019 | Ito .............................. | G06F 9/38 |
| 2021/0049804 | A1* | 2/2021 | Sarel ...................... | G06N 3/063 |

FOREIGN PATENT DOCUMENTS

| | | |
|---|---|---|
| CN | 109409512 A | 3/2019 |
| GB | 2569269 A | 6/2019 |
| GB | 2575291 A | 1/2020 |
| GB | 2575294 A | 1/2020 |

OTHER PUBLICATIONS

Search Report and Written Opinion dated Apr. 13, 2021 for PCT/EP2020/087570. 14 pages.
Search Report for Great Britain Patent Application No. GB2000587.2 dated Jun. 18, 2020. 4 pages.

* cited by examiner

*Primary Examiner* — Mahran Y Abu Roumi
(74) *Attorney, Agent, or Firm* — Haynes and Boone, LLP

(57) ABSTRACT

A data processing system comprising a plurality of processors, wherein each of the processors is configured to perform data transfer operations to transfer outgoing data to one or more others of the processors during a first of the exchange stages; receive incoming data from the one or more others of the processors during the first of the exchange stages; determine further outgoing data in dependence upon at least part of the incoming data; count an amount of at least part the incoming data received during the first of the exchange stages from the one or more others of the processors; and in response to determining that the amount of the at least part of the incoming data received has reached a predefined amount, perform data transfer operations to transfer the further outgoing data to the one or more others of the processors during a second of the exchange stages.

20 Claims, 19 Drawing Sheets

CONTROL OF DATA TRANSFER BETWEEN PROCESSORS

CROSS-REFERENCE TO RELATED APPLICATIONS

The present application claims priority to United Kingdom Patent Application No. 2000587.2, filed on Jan. 15, 2020 which is hereby incorporated by reference in its entirety.

TECHNICAL FIELD

The present disclosure relates to the control of data transfer between processors.

BACKGROUND

When performing large scale parallel operations, multiple processors are provided within a data processing system. In some cases, each of the processors may be configured to perform the same set of operations on a different set of data. Each of the processors may perform its respective calculations during a compute phase, before exchanging results with one or more of the other processors during an exchange phase. The exchange of results allows synchronisation to be achieved between different processors in the case that each produces different results in the context of a larger operation.

One example of the application of a multi-processor system is found in the context of machine learning algorithms, for example, in the context of deep neural networks. As will be familiar to those skilled in the art of machine intelligence, a machine intelligence algorithm is based around performing iterative updates to a "knowledge model", which can be represented by a graph of multiple interconnected nodes Each node represents a function of its inputs. Some nodes receive the inputs to the graph and some receive inputs from one or more other nodes. The output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective model built-in parameters, e.g. weights. During a learning stage, the aim is, based on a set of experiential input data (i.e. samples), to find values for the various parameters such that the graph as a whole will generate a desired output for a range of possible inputs. The graph having those derived parameters can then be applied, during an operating phase, to generate output values using further input data Various algorithms for performing the training of a graph are known in the art, such as a back propagation algorithm based on stochastic gradient descent. Over multiple iterations (i.e. epochs) based on the training set, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The training of a neural network can be performed using a multi-processor system. Typically, at least some of the processing of each node can be carried out independently of processing of other nodes in the graph, and therefore large graphs expose great opportunities for concurrency and/or parallelism. The training of a neural network using a multi-processor system is achieved by applying data parallelism in which each processor derives updates to the weights for a neural network using a different data set. The updates are then synchronised between the processors during an exchange phase. Such a synchronisation process may involve exchanging updates between the processors in one stage, with each processor performing operations on updates, e.g. averaging, it receives in the stage before moving on to a further stage where the results of those operations, e.g. averaged updates, are themselves exchanged.

SUMMARY

When data exchange occurs between processors of a system, it may be desired for the processors to avoid running ahead in the overall process and starting to exchange data in the next stage before its recipient is ready to receive the data. If the recipient is not ready to receive data that is transferred to it, some of the data exchanged between the processors may never reach its target memory location (e.g. a receive buffer) and the data is lost in transmission. For example, consider a plurality of processors comprising a first processor and a second processor, which exchange data at each stage in the overall exchange process and perform operations on the received data. During a first exchange stage of the overall process, the first processor receives data from the second processor and sends data to the second processor. Subsequently, the first processor and second processor will perform a further exchange of data. If the second processor runs ahead in the process, and transfers data to the first processor too early, a buffer in the first processor may be overrun and data contained in the first processor may be overwritten. This could happen, for example, if the first processor hasn't finished processing data it received in a previous stage or if it hasn't finished sending data to another processor (e.g. the second processor or a third processor). Therefore, the data sent to the first processor in the previous stage or the data for sending by the first processor may be overwritten before the first processor has been able to complete the processing of data received in a previous stage and/or the transfer of further data. The same applies to data transfer from the first processor to the second processor, i.e. it may generally be desired to prevent the first processor running ahead and overrunning the buffer in the second processor. Therefore, it may generally be desired to prevent processors that exchange data from running ahead of one another in the overall exchange process. In other words, it may generally be desired to guarantee synchronisation between processors.

One existing way to address this problem for a processor sending a set of data, is to transmit a notification or interrupt that indicates to the recipient processor that transmission of the set of data to the recipient is complete. This may be done in accordance with a transport protocol, e.g. TCP, that allows the handling of transport credits. However, there are problems with this, which are that there may be a significant overhead and network delay associated with the transmission of such notifications.

Therefore, the inventors have recognised a need for a low overhead way of preventing communicating processors from running ahead of one another. The present description provides a lower overhead technique for synchronising the exchange of data between processors, such that the processors do not run ahead of one another.

According to a first aspect, there is provided a data processing system comprising a plurality of processors, wherein each of the processors comprises at least one circuit configured to perform data transfer operations during each of at least some of a plurality of exchange stages to transfer data determined in dependence upon data received at the respective processor in a preceding one of the exchange stages from at least one other of the processors, each of the data transfer operations being for transfer of data to another one of the plurality of processors, wherein each at least one circuit is configured to: perform data transfer operations to transfer outgoing data to one or more others of the processors during a first of the exchange stages; receive incoming data from the one or more others of the processors during the first of the exchange stages; determine further outgoing data in dependence upon at least part of the incoming data; count an amount of at least part of the incoming data received during the first of the exchange stages from the one or more others of the processors; and in response to determining that the amount of the at least part of the incoming data received has reached a predefined amount, perform data transfer operations to transfer the further outgoing data to the one or more others of the processors during a second of the exchange stages.

By counting an amount of data received from another processor before performing data transfer operations to transfer further outgoing data, a processor is prevented from running ahead of that other processor and transferring data to the other processor before that other processor is ready to receive the further outgoing data.

In some embodiments, each of the at least one circuits is configured to: prior to the determining that the amount of the at least part of the incoming data received has reached the predefined amount, perform only some of the data transfer operations to transfer only part of the outgoing data to one or more others of the processors; and in response to the determining that the amount of incoming data received has reached the predefined amount: perform remaining data transfer operations to transfer a remaining part of the outgoing data to the one or more others of the processors during the first of the exchange stages; and subsequently, perform the data transfer operations to transfer the further outgoing data to the one or more others of the processors during the second of the exchange stages.

In some embodiments, each of the at least one circuits is configured to: count an amount of a further part of the incoming data received during the first of the exchange stages from the one or more others of the processors; and following starting to perform the remaining data transfer operations, determine that the amount of the further part of the incoming data received has reached a predefined amount, wherein the subsequently, perform the data transfer operations to transfer the further outgoing data to the one or more others of the processors during the second of the exchange stages is performed in response to determining that the amount of the further part of the incoming data received has reached a predefined amount.

In some embodiments, the at least part of the incoming data is addressed to a first location in the processor, wherein the further part of the incoming data is addressed to a second location in the processor.

In some embodiments, for each of the processors, the one or more others of the processors comprises two or more processors.

In some embodiments, for each of the processors, the two or more processors comprises only two processors.

In some embodiments, wherein each of the processors comprises a plurality of processing units, each of at least some of the plurality of processing units being configured to: receive part of the incoming data from the one or more others of the processors; and send part of the outgoing data to the one or more others of the processors, wherein the steps of counting the amount of incoming data received and determining that the amount of the incoming data received has reached the predefined amount are performed by one or more of the plurality of processing units of a first type.

In some embodiments, each processor comprises two of the plurality of processing units of the first type, wherein for each processor: a first of the plurality of processing units of the first type is configured to perform the steps of counting the amount of incoming data received and determining that the amount of the incoming data received has reached the predefined amount, a second of the plurality of processing units of the first type is configured to perform the steps of counting the amount of the further part of the incoming data received and determine that the amount of the further part of the incoming data received has reached a predefined amount.

In some embodiments, each of some of the at least some of the plurality of processing units is configured to, subsequent to performing its respective operations to send part of the outgoing data, cause control to pass to another one of the at least some of the plurality of processing units for that another one to perform its respective operations to send part of the outgoing data.

In some embodiments, each of the one or more of the plurality of processing units of the first type is configured to perform the causing of control to pass in response to determining that an amount of a part of the incoming data received has reached a predetermined amount.

In some embodiments, each of the incoming data, outgoing data, and further outgoing data comprise a set of gradients for weights of a machine learning model.

In some embodiments, each of the at least one circuit comprises: counting circuitry configured to perform the counting an amount of the incoming data received during the first of the exchange stages; and an execution unit configured to execute computer readable instructions to: poll the counting circuitry to determine the amount of the incoming data received; and determine that the amount of the incoming data received has reached the predefined amount.

In some embodiments, the at least one circuit comprises a remote direct memory access engine configured to perform the data transfer operations during each of a plurality of exchange stages.

In some embodiments, the plurality of processors are arranged in a ring topology such that the at least one circuit of each processor is configured to perform the data transfer operations during each of the plurality of exchange stages to transfer data to its two neighbouring processors in the ring, wherein the counting the amount of the incoming data received during the first of the exchange stages from the one or more others of the processors comprises counting an amount of data received from the two neighbouring processors during the first of the exchange stages.

In some embodiments, the determining further outgoing data in dependence upon at least part of the incoming data comprises reducing the at least part of the incoming data with data stored in memory of the respective processor.

In some embodiments, the at least one circuits of the plurality of processors are configured to implement a reduce-scatter collective comprising the steps of each of the at least one circuits: transferring data determined in dependence upon data received at the respective processor in a preceding stage from at least one other of the processors; and determining further outgoing data in dependence upon at least part of the incoming data.

In some embodiments, the at least one circuit comprises at least one of a field programmable gate array or application specific integrated circuit configured to performing the counting of an amount of the incoming data received during the first of the exchange stages from the one or more others of the processors.

According to a second aspect, there is provided a method implemented in a data processing system comprising a plurality of processors, the method comprising at each of the processors: performing data transfer operations during each of at least some of a plurality of exchange stages to transfer data determined in dependence upon data received at the respective processor in a preceding one of the exchange stages from at least one other of the processors, each of the data transfer operations being for transfer of data to another one of the plurality of processors; performing data transfer operations to transfer outgoing data to one or more others of the processors during a first of the exchange stages; receiving incoming data from the one or more others of the processors during the first of the exchange stages; determining further outgoing data in dependence upon at least part of the incoming data; counting an amount of at least part the incoming data received during the first of the exchange stages from the one or more others of the processors; and in response to determining that the amount of the at least part of the incoming data received has reached a predefined amount, performing data transfer operations to transfer the further outgoing data to the one or more others of the processors during a second of the exchange stages.

BRIEF DESCRIPTION OF DRAWINGS

For a better understanding of the present description to show how the same may be carried into effect, reference will now be made by way of example to the accompanying drawings.

DETAILED DESCRIPTION

Example embodiments of the description will now be described in more detail with reference to the accompanying Figures.

Figure 4:
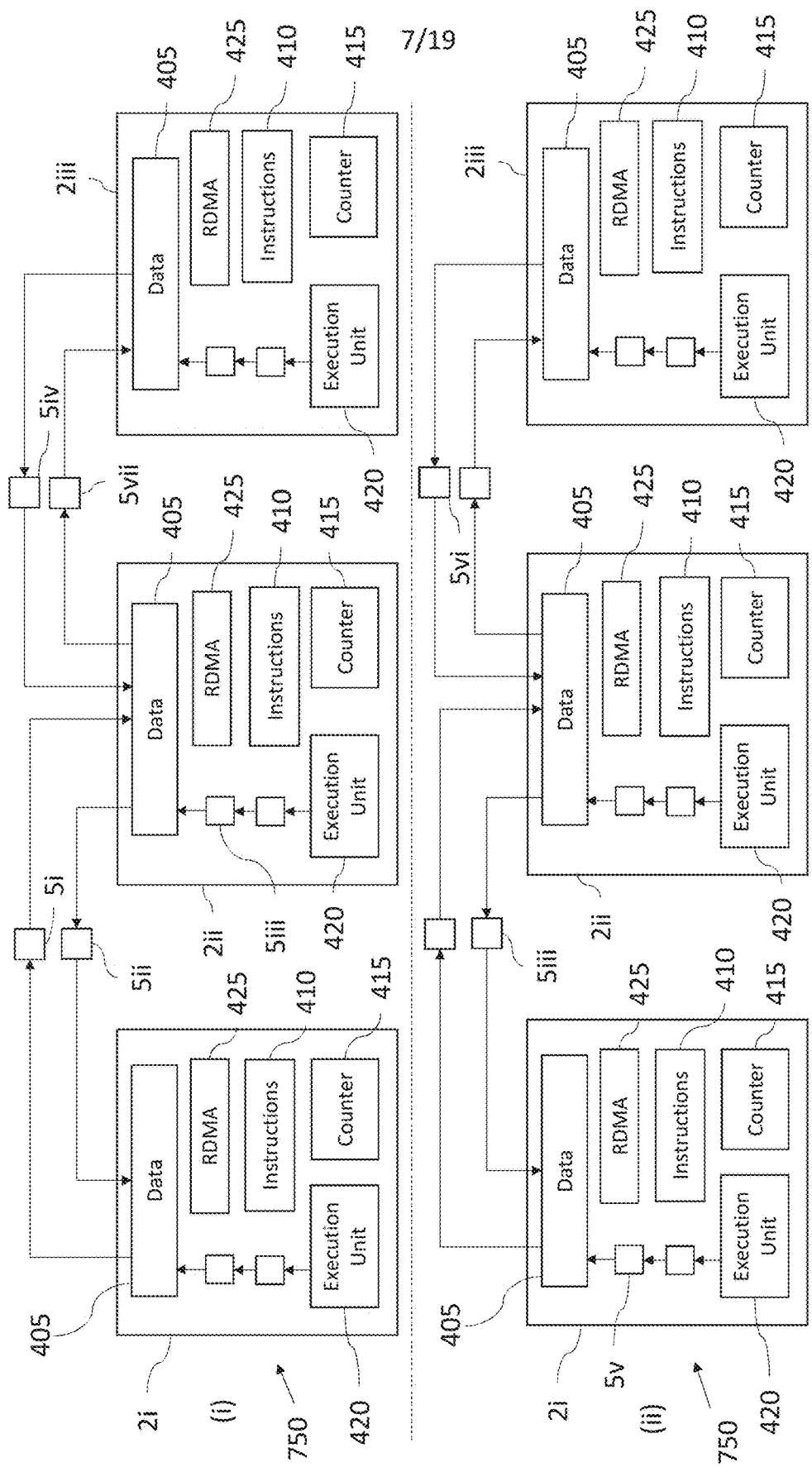
FIGS. 4 and 4A show schematic diagrams illustrating the use of counting circuitry to control the transfer of data between processors.
Figure 4A:
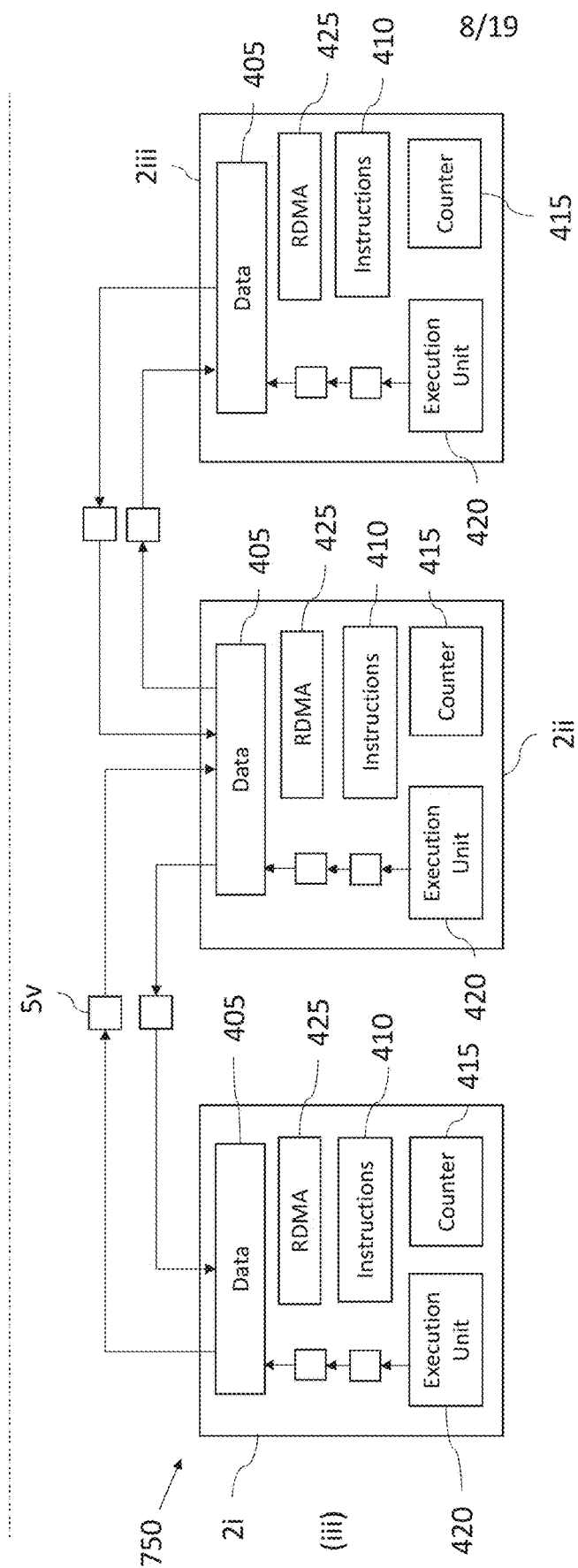

Reference is made to FIGS. 4 and 4A, which illustrate a data processing system 750 comprising a plurality of processors 2$i$, 2$ii$, 2$iii$ (collectively referred to as processors 2). Each of the plurality of processors 2 comprises at least one execution unit 420, an instruction memory 410, a data memory 405, at least one counting circuitry 415, and at least one remote direct memory access (RDMA) engine/controller 425.

FIG. 4 illustrates three stages in a data exchange process. The first stage is labelled as stage (i). The second stage is labelled as stage (ii). The third stage is labelled as stage (iii). In each of the stages, data is exchanged between the processors 2. For example, during the first stage, data item 5$i$ is provided from processor 2$i$ to processor 2$ii$. The term 'data item' is understood here to mean a set of data, and no limitation as to the form of the data is intended by the term 'data item'. Each data item is a set of data sent from one processor to another during a single exchange stage. Each data item may comprise one or more data packets that are sent between two of the processors 2 during an exchange stage. The data items received at a processor 2 during a particular exchange stage may be referred to as incoming data, whereas the data items sent by a processor 2 during a particular exchange stage may be referred to as outgoing data.

The execution unit 420 of each processor 2 is configured to execute instructions stored in instruction memory 410 to generate each of the data items, which are stored in memory 405. The RDMA engine 425 of each processor 2 is configured to transfer data items to each of the processor's neighbouring processors by remote direct memory access. Although, in the example of FIG. 4, an RDMA engine 425 transfers the data items to the other processors, in other example embodiments another type of circuitry may perform this transfer. For simplification, only three processors are shown in the system 750. However, in embodiments, there may be additional processors, with each of the processors 2$i$ and 2$iii$ configured to transfer data to a further respective processor other than processor 2$ii$ during each exchange stage.

The different exchange stages are defined by dependency relationships between the data that is sent in the stages. Specifically, during each stage, a processor 2 sends data to another of the processors 2, where the data that is sent depends upon the data received at that processor 2 in the immediately preceding stage. For example, in the first exchange stage, the processor 2$ii$ is configured to send data 5$ii$ to processor 2$i$ and receive data 5$iv$ from processor 2$iii$. Data values of outgoing data 5$ii$ may be independent of data values of incoming data 5$iv$. However, following receipt of data iv, the processor 2$ii$ calculates data 5$iii$ in dependence upon data 5$iv$ received in the first exchange stage and sends data 5$iii$ to processor 2$i$ in the second exchange stage.

Therefore, the data sent by the processor 2*ii* during the second exchange stage is dependent upon data it receives from one or more other processors in the first exchange stage. For each of the processors 2, the data they send in one stage depends upon the data they received in the preceding exchange stage.

The counting circuitry 415 of each processor 2 is used to control data transfer between the processors 2 and ensure implicit neighbour synchronisation. The counting circuitry 415 may comprise at least one processor configured to execute software instructions to perform the counting. Alternatively, the functions of the counting circuitry 415 may be implemented in hardware, for example, in one or more field programmable gate arrays (FPGAs) or one or more application specific integrated circuits (ASICs). The counting circuitry 415 counts an amount of at least some of the data of data items received at a processor 2 from one or more others of the processors 2.

For example, the RDMA engine 425 of processor 2*i* causes data item 5*i* to be transferred to processor 2*ii*. The data item 5*i* is received at processor 2*ii* and stored in memory 405 of processor 2*ii*. The counting circuitry 415 of processor 2*ii* counts the number of bytes of at least part of data item 5*i* received at processor 2*ii*. Similarly, the RDMA engine 425 of processor 2*iii* causes data item 5*iv* to be transferred to processor 2*ii*. The data item 5*iv* is received at processor 2*ii* and stored in memory 405 of processor 2*ii*. The counting circuitry 415 of processor 2*ii* counts the number of bytes of at least part of data item 5*iv* received at processor 2*ii*.

Therefore, the counting circuitry 415 counts received bytes of incoming data 5*i* and 5*iv* to determine an amount of data received during the first exchange stage (i). The execution unit 420 of processor 2*ii* polls the counting circuitry 415 to determine whether the number of bytes of received data matches a number of bytes expected to be counted for the first exchange stage (i) as recorded in the instructions in instruction memory 410. The counting circuitry 415 may count only some of the bytes of received data items 5*i*, 5*iv*, but enables the execution unit 420 to determine when a predefined amount of a selection of the data is received for the first exchange stage. For example, the counting circuitry 415 may count only certain parts of the data 5*i*, 5*iv* that is directed to certain addresses in processor 2*ii*, and determine when the amount of data directed to those addresses is received at the processor 2*ii*.

The processor 2*ii* will not progress to the second exchange stage until it is determined that a predefined amount of incoming data has been counted during the first exchange stage. In response to the determination that the predefined amount of data has been counted, the processor 2*ii* will perform the data transfer operations of the second exchange stage. The processor 2*ii* does not necessarily progress to the second exchange immediately upon determining the predefined amount of data is received, but may first finish transmitting its data during the first exchange stage, e.g. finish transmitting data item 5*ii* to processor 2*i*. For example, the processor 2*ii* will transmit only part of data 5*ii* to processor 2*i*, and then wait until the counting circuitry 415 counts that the predefined amount of data has been received during the first exchange stage. Then, in response to determining that the predefined amount of data has been received, the processor 2*ii* will transmit the remaining part of data item 5*ii* to processor 2*i*, before moving on to the second exchange stage.

During the second exchange stage, the processor 2*ii* performs its data transfer operations to transfer outgoing data to the other processors 2*i* and 2*iii*, including, for example, the transfer of data item 5*iii* to processor 2*i*.

In the example shown in FIGS. 4 and 4A, a further implicit barrier is enforced between the second exchange stage and a third exchange. The processor 2*ii* counts at least some of the incoming data received during the second exchange stage, and compares this to a predefined amount. The predefined amount need not be the same as the predefined amount counted by the counting circuitry 415 during the first exchange stage. The processor 2*ii* will not progress to the third exchange stage until it determines that the predefined amount has been counted. In response to determining that the predefined amount of data has been counted, the processor performs the data transfer operations to send data during the third exchange stage. The third exchange stage is shown in FIG. 4A and comprises sending data to the processor 2*i* and processor 2*iii*.

Therefore, processor 2*ii* performs a counting process of at least some of the data it receives to prevent it from running ahead. Similar counting processes are applied at processor 2*i* to prevent processor 2*i* from running ahead and at processor 2*iii* to prevent processor 2*iii* from running ahead. For example, the first processor 2*i* receives data 5*ii* from processor 2*ii* during the first exchange stage. The first processor 2*i* counts an amount of at least part of the data 5*ii* received and will only progress to the second exchange stage to transfer further outgoing data to processor 2*ii* when it determines that the amount of the incoming data received and counted reaches a predefined amount.

The counting process is, therefore, used at each processor 2 to determine whether or not that processor 2 is able to proceed to transfer data at the next stage in the process. Therefore, the description above of the counting process performed by processor 2*ii* when receiving data from other processors 2 in the system 750 applies equally to the other processors 2 in the system 750. Each of the processors 2 counts data that it receives from one or more other processors in the multi-processor system 2, and will only proceed past a certain point in its data transfer operations once a predefined amount of data has been received from the one or more other processors in the system. Although the processors 2*i* and 2*iii* are shown as only receiving data from processor 2*ii* during each exchange stage, they may, during each exchange stage, also receive data from other processors (not shown). The processors 2 may be arranged in a ring, where each of the processors 2 receives data from both of its neighbours during an exchange stage and applies a counting process to data received from both processors to determine when to proceed with data transfer operations of subsequent exchange stage.

It may be understood that by preventing processors from running ahead in this way, buffer overflow can be prevented. If each processor 2 generates data for transfer based on data it received in a preceding stage, the processor 2 requires that data until it has generated and transferred the new data. Until then the data received in the preceding stage cannot be overwritten. Therefore, it may be desirable in some instances that each of the processors 2 are prevented from running ahead and proceeding to a subsequent exchange stage before the other processors 2 are ready.

According to one example, it may be understood how the effect is achieved in the following way. The execution unit 420 of processor 2*ii* is configured to receive data item 5*iv* from processor 2*iii* in the first exchange stage (i) and store this data item 5*iv* in its memory 405. The processor 2*ii* processes the data item 5*iv* to produce a further data item 5*iii*, which is also stored in memory 405. Data item 5*iii* is for transfer to processor 2*i* during the second stage (ii). During the second stage (ii), the processor 2*ii* transfers the data item 5*iii* produced in dependence upon data item 5*iv* to processor 2*i*. The execution unit 420 of processor 2*i* may generate data item 5*v*, which is for transfer to processor 2*ii*. However, the data items 5*iv* and 5*iii* occupy space in the memory 405 of processor 2*ii*. The processor 2*ii* may be required to continue to store data items 5*iv* and 5*iii* in memory 405 until it has generated, and transferred to processor 2*i*, at least part of data item 5*iii*. In other words, in this example the processor 2*ii* must complete at least part of its data transfer operations for the second exchange stage (ii). Once the processor 2*ii* has completed the data transfer operations for the second exchange stage (ii), the data items 5*iv* and 5*iii* are no longer required to be stored in memory 405 and can be overwritten. If the data item 5*v* is transferred to the processor 2*ii* too early, the memory 405 of processor 2*ii* may overflow and the relevant part of data items 5*iv* and 5*iii* may be overwritten. In other words, the overflow of memory 405 of processor 2*ii* may happen if the processor 2*i* runs ahead to the exchange stage (iii) prior to the processor 2*ii* at least reaching a certain point in its data exchange operations for exchange stage (ii) after which data item 5*v* can be shared to processor 2*ii* without overwriting parts of data items 5*iv* and 5*iii* that may still be required to be held by processor 2*i*.

In order to prevent processor 2*i* from running ahead, the processor 2*i*, before transferring the data item 5*v* to processor 2*ii*, confirms that processor 2*ii* has reached the certain point in its data transfer operations for stage (ii). This is achieved by the counting circuitry 415 of processor 2*i* counting an amount of data from data item 5*iii* received from processor 2*ii* during the second stage (ii). The execution unit 420 polls the counting circuitry 415 and compares the amount of data of item 5*iii* that has been received to a predefined amount. The predefined amount of data is stored as part of the pre-compiled instructions in instruction memory 410. Once the predefined amount of data of data item 5*iii* has been received and counted, the processor 2*i* may proceed to transfer data item 5*v* in the third exchange stage since it is, at that point, known that the processor 2*i* will not overwrite required data in memory 405 of processor 2*ii* when transferring the data item 5*v*.

Once the processor 2*i* determines that the data item 5*iii* is received from processor 2*ii*, it proceeds to the third exchange stage (iii) shown in FIG. 4A. In this stage (iii), the processor 2*i* transfers data item 5*v* to processor 2*ii*. This data item 5*v* is stored in data memory 405. Since the transfer of relevant parts of data item 5*iii* has been completed during the previous exchange stage (ii), the relevant parts of data items 5*ii* and item 5*iii* are no longer required in memory 405, and the problem with overflow is avoided.

Processor 2*ii* has been used as an example here of how overflow in memory 405 is avoided. It would, however, be appreciated by the skilled person that in some embodiments, each of the processors 2 employs a similar mechanism when exchanging data. The processors may be configured to exchange data with one another in a ring structure in each of the processors 2 exchanges a data item with each of its two neighbouring processors. The processors 2*i* and 2*iii* will also exchange data items with processors (not shown) other than processor 2*ii*. The counting circuitry 415 counts the two received data items from its neighbours 5*ii* during a particular exchange stage. Each processor 2*i* only proceeds to the next exchange stage in response to determining that it has received at least a certain part of the two data items from each of its neighbours. Therefore, an implicit barrier is enforced for each exchange stage that prevents any of the processors 2 from running ahead in the process.

In some embodiments, two implicit barriers are enforced per exchange stage. Each of the processors 2 sends part of its data to one or more others of the processors 2 during an exchange stage and counts an amount of data received from the one or more other processors 2. In this case, each processor 2 will wait until it has received a predefined amount of data before sending further data to the other processors 2 during the same exchange stage. Thus a first implicit barrier is imposed. Following the starting sending of its further outgoing data, each processor 2 will count an amount of further incoming data received from the one or more other processors 2. Each processor 2 will wait until it has received a predefined amount of the further incoming data before progressing on to the next exchange stage. Thus, a second implicit barrier is imposed.

Imposing two implicit barriers per exchange stage may have advantages when the processors 2 communicate in certain topologies, e.g. the ring topology in which each processor communicates with two neighbours. By using two barriers, not only is a processor prevented from running ahead of its neighbours, but also a processor's neighbours are prevented from running ahead of each other. For example, in FIG. 4, the processor 2*ii* is configured to, during the first exchange stage, receive data 5*i* from processor 2*i* and data 5*iv* from processor 2*iii*. When only a single implicit barrier is used, the processor 2*iii* may progress to the second exchange stage and start sending data 5*vi* to processor 2*ii* whilst processor 2*i* is still sending data 5*i* to processor 2*ii*. In this case, processor 2*ii* is receiving data corresponding to different exchange stages. Unless the data is tagged in some way, the processor 2*ii* may be unable to determine whether the data is data corresponding to the first exchange stage or the second exchange stage. This problem may addressed by applying a second implicit barrier in each exchange stage. In this case, the processor 2*ii* counts an amount of a first part of data 5*i* and will only send a second part of data 5*vii* to processor 2*iii* once a predefined amount of the first part of data 5*i* has been received. In other words, the processor 2*i* sends the second part of data vii to processor 2*iii* once a first implicit barrier for the first exchange stage has been passed. The processor 2*iii* counts an amount of the second part of data 5*vii* it receives and will progress to the second exchange stage once it has counted a predefined amount of the second part of data 5*vii*. Therefore, processor 2*iii* cannot proceed to the second exchange stage at least until the processor 2*ii* has finished receiving all of the first part of data 5*i*. Subsequently, when the processor 2*ii* receives data 5*vi* from the processor 2*iii*, it counts this data separately to the part of the data 5*i* that is still incoming from the processor 2*i*, since it is known by processor 2*ii* that the remaining part of data 5*i* that it is receiving is the second part of data 5*i* (i.e is sent following the first implicit barrier of the first exchange stage) and, therefore, it cannot be confused with the first part of data 5*vi* (i.e. that sent prior to the first implicit barrier of the second exchange stage). This separate counting can be achieved by each of the processors 2 sending, following each first implicit barrier, its data to different addresses in the recipient processor to that data sent prior to the second implicit barrier. Each different address may be associated with a different counting circuitry so that the recipient processor 2 counts such data separately. This is implemented in a multi-tile processor system as described in more detail below.

Figure 1:
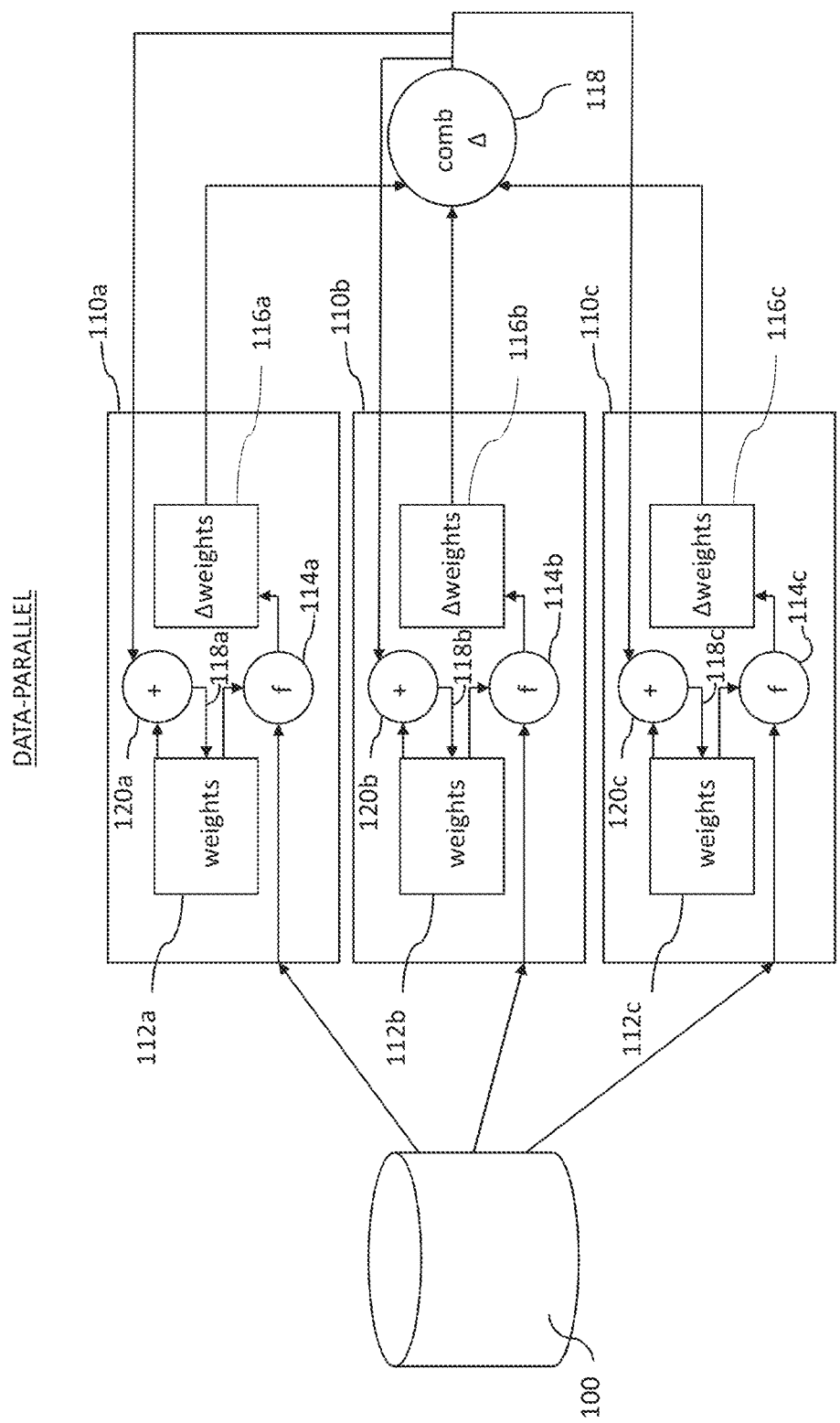
FIG. 1 is a schematic diagram illustrating distributed training in a neural net.

Embodiments of the description may be applied during the exchange of data between processors when training a machine learning model. In order to explain such an example application of the disclosed techniques, FIG. 1 shows a schematic block diagram of a distributed architecture for training a neural network. A source of training data 100 is provided. This may be a database or any other kind of data store capable of holding training data applicable to the neural network model being trained. Processing according to the neural network model is itself distributed across multiple processors 110a, 110b, 110c etc. Only three units are shown in FIG. 1, but it will readily be appreciated that any number of processors could be utilised. Each processor 110a, b, c receives batches of training data from the training data source 100. Each processor 110a, b, c holds a set of parameters 112a, 112b, 112c which define the model. An incoming batch of training data is processed with a current set of parameters in a calculation function 114 and the results of the calculation function are used to generate so-called deltas which represent the difference between the original parameter and the new parameter as a result of applying the calculating function on the batch of training data and the current set of parameters. In many neural networks, these parameters are termed "weights" and so the delta values are termed "delta weights". The delta weights may otherwise be known as gradients. The weights are labelled 112a, b, c and the delta weights are labelled 116 a, b, c in FIG. 1. It will be appreciated that in practice, the weights and delta weights are stored in suitable stores accessible by the processor. If the weights and delta weights can be held in local memory, this renders the training process much more efficient.

The aim with the architecture of FIG. 1 is not to train three separate models but to train a single model in a distributed manner. Therefore, the purpose is to have the model parameters (or weights) converged to a single common set in each processor. Starting from any particular set of weights, and assuming that the batch of training data received at each processor is not identical, then there will be a variation in the delta weights which are produced by each calculation function in each processor. What is disclosed, therefore, is a way to aggregate the delta weights across the processors after each iteration of batched training data. This is shown diagrammatically in FIG. 1, where a combinational function 118 receives the delta weights from each processor and performs a mathematical function which reduces the delta weights, such as a sum or averaging function. The output of the combinatorial function 118 is then fed back to combining circuitry 120a, 120b and 120c within each processor respectively. A new set of weights is thus produced as a combination of the original weights and the combined output from the combinatorial function 118, and the new weights 118a, 118b, 118c are stored back into local memory. Then, the next batch of training data is supplied to each processor and the process repeats multiple times. If the starting weights of the processors are the same, then after each iteration they will be updated to the same, new values in a consistent manner. Delta weights are supplied to the combinatorial function 118 where they are reduced, and they are then supplied back to each of the processors in their reduced form, where they can be combined with the original weights.

One way in which the exchange of data may be efficiently implemented between processors is through the use of communication collectives, which are routines commonly used when processing data in a computer. They are routines which enable data to be shared and processed across multiple different processes, which may be running on the same processor or different processors. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. One such collective is termed "all-reduce". An all-reduce operation enables a result of a compute function acting on equally sized multiple data values from different source processes to be provided at a receiving process. Note that a receiving process may be one of the source processes, and that there may be multiple receiving processes. The all-reduce collective reduces the data values from multiple source processes and distributes the results to all the source processes, (which are acting as receiving processes for the reduced result). According to the MPI Standard, the all-reduce collective may be implemented by reducing the data values from all source processes in a reduce collective (e.g. at one of the processes) and then broadcasting the result to each source process.

Figure 1A:
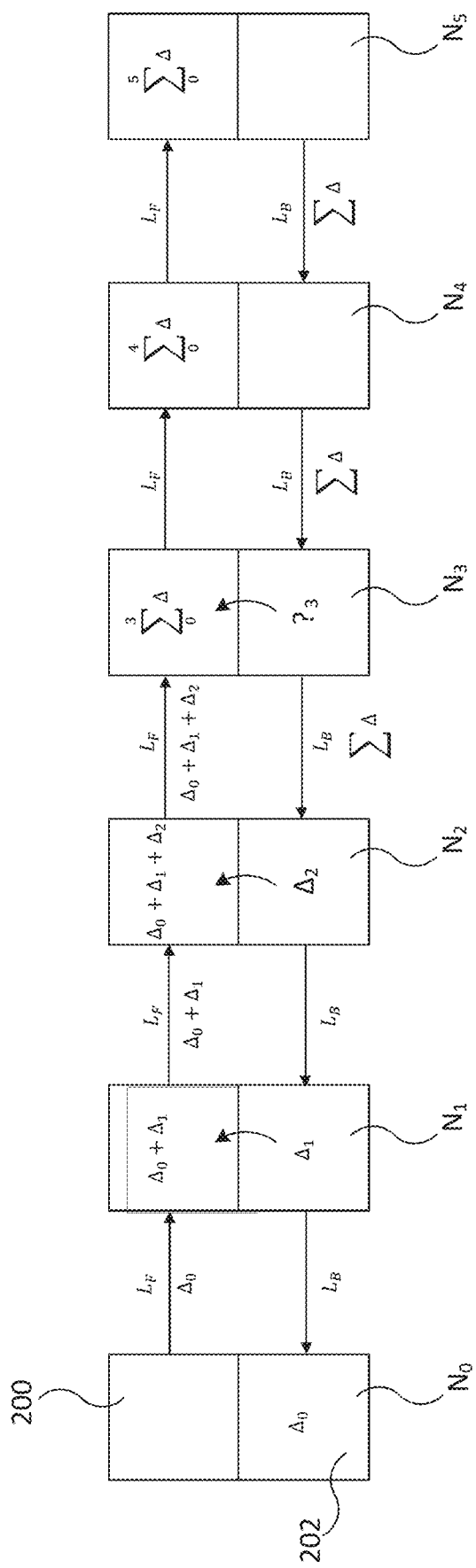
FIG. 1A is a schematic diagram showing a line of processors for implementing a simple "streaming" line all-reduce algorithm.

FIG. 1A is a schematic diagram to illustrate how an all-reduce collective might be implemented in a line connected topology of five processors $N_0$ . . . $N_5$. These processors may correspond to the processors of FIG. 1 in which the combinational function is distributed. The processors are shown connected in a line configuration where each processor is connected to its neighbour by a "forwards" links $L_F$ and a "backwards" link $L_B$. As shown in the diagram, and as the directional phrases imply, the forward links connect processors from the left to right in FIG. 1A, and the backwards links connect processors from the right to left in FIG. 1A. Each processor has a processing capability designated 200, and a storage capability designated 202. Each processor also has one or more link interface which enables it to be connected to its neighbouring processor via the links $L_F/L_B$.

Furthermore, the backward links are not utilised for broadcast until the fully reduced result has been obtained at the end node. However, if the partial vectors are large, the head of the result will return to the starting node well before that node has finished sending its partial, so there is a substantial overlap of activity on all forward and backward links.

Figure 1B:
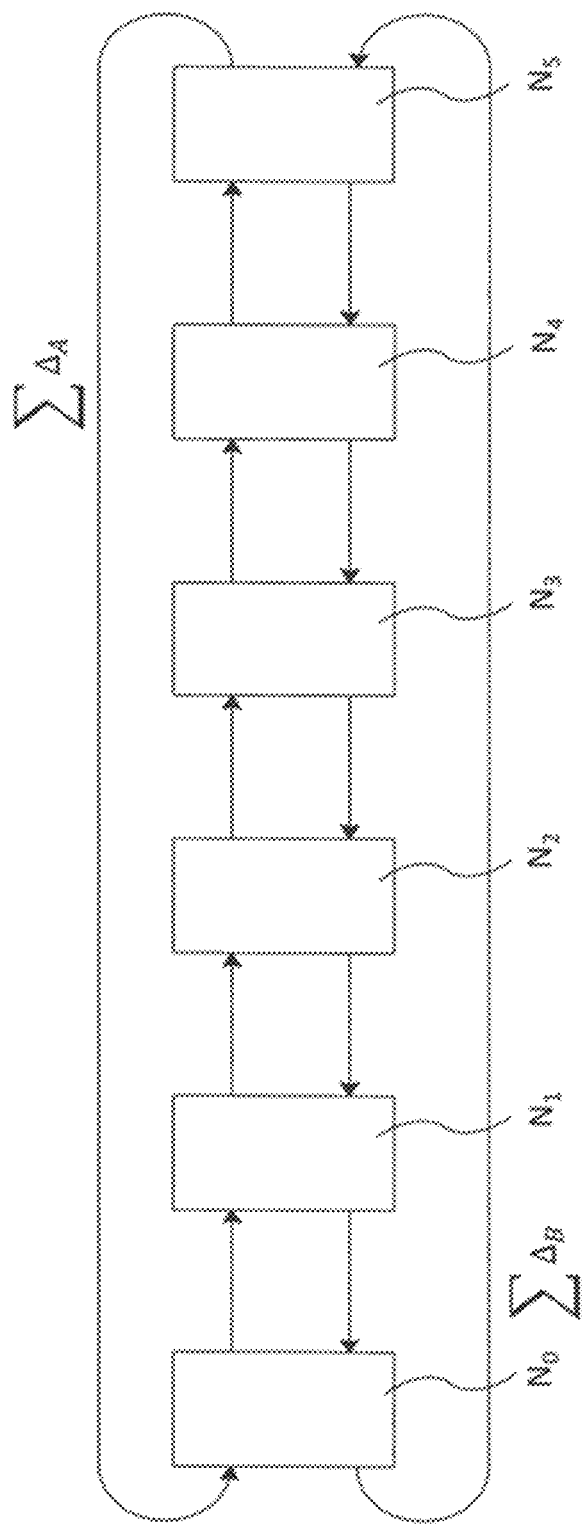
FIG. 1B is a schematic diagram of a line with the end nodes connected into a ring.

In a modification to this algorithm, which represents a small improvement, processing nodes at each end of the line can start to transmit their partials towards a central node, with the reduction being completed at the central nodes. In that case, the result is broadcast back to the end nodes when continued forwarded throughout to the end of the line. Note that in this scenario, there would be a reversal in the direction of movement, for example between nodes $N_2$ and $N_3$, and $N_3$ and $N_4$ on both the forward and backward links. If a line is closed into a ring (by connecting the final node $N_5$ to the first node $N_0$ on both the backward and forward links), a pipeline algorithm can serialise reduction and broadcast in the same direction, so that the two logical rings formed by the bi-directional links can each operate independently on half of the data. See FIG. 1B That is, each partial is split into two parts. A first half Δ A is reduced on the forward links (as in FIG. 1A), and broadcast on the connecting leg between $N_5$ and $N_0$. The other half of the vector Δ B is reduced on the backward links, and then broadcast on the connecting ring of the backward links.

Using rings in two dimensions, an alternative approach is to implement Allreduce using a reduce-scatter collective followed by an Allgather collective. A paper authored by Jain and Sabharwal entitled "Optimal Bucket Algorithms for large MPI collectives on torus interconnects" (ICS' 10, June 2-4, Tsukuba) presents bucket based algorithms for Allgather, reduce-scatter and Allreduce collectives assuming bi-directional links between processing nodes in a torus interconnected processor. This approach operates on the basis that there are multiple data values (fragments) to be handled in each step. In the reduce-scatter collective, each process starts with an initial partial vector. It is assumed that a reference here to a process is to a process carried out on a processing node. A partial vector can be divided into multiple elements or fragments. The corresponding elements of all processes are reduced and these reduced elements are then distributed across the processes. In the Allgather collective, every process receives all elements from all other processes. The reduce-scatter collective reduces all partials and stores each reduction on a respective node—see FIG. 2. The Allreduce collective operation can be implemented by performing a reduce-scatter collective followed by an Allgather collective operation.

Figure 2:
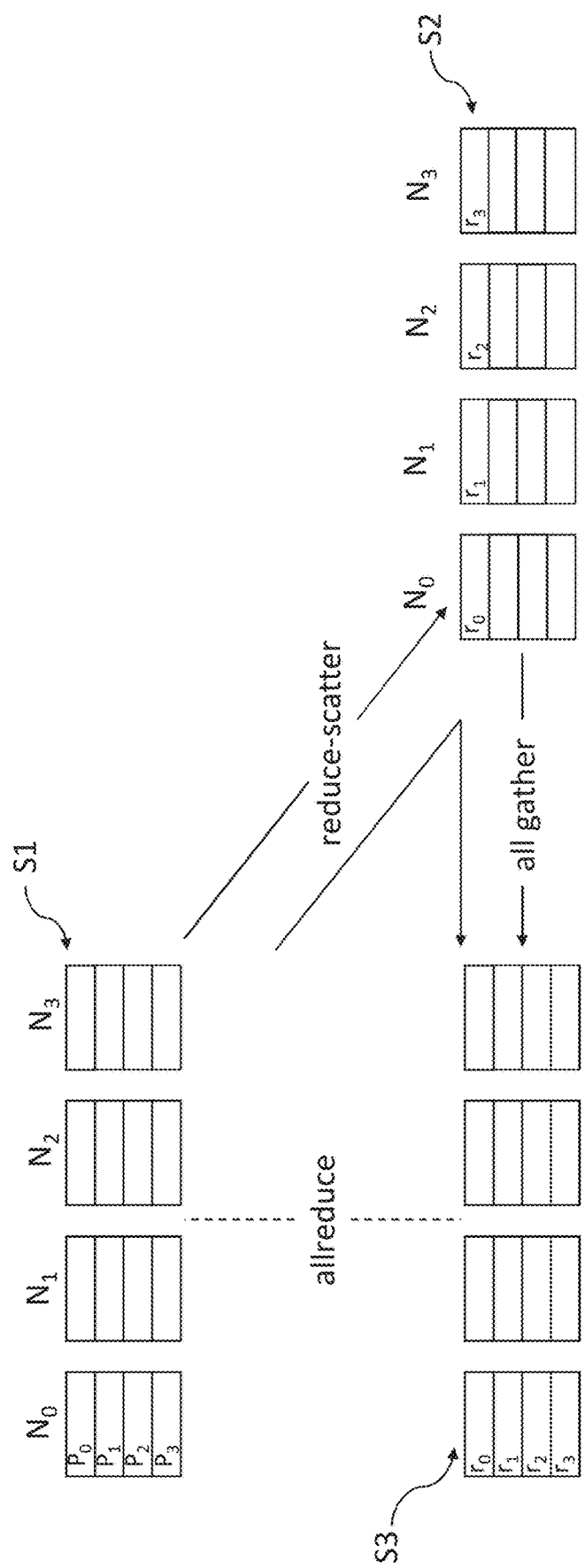
FIG. 2 is a schematic diagram illustrating the implementation of an all-reduce function involving a reduce-scatter step followed by an allgather step.

The all-reduce collective, which may be used to exchange the delta weights between processors, is illustrated in FIG. 2. FIG. 2 shows a set (vector) of partial values or "partial" $P_0$, $P_1$, $P_2$, $P_3$ on each of four processors in a starting state S1. In this context, a processor is a processor in a network of processors. Note that each processor $N_0$, $N_1$, $N_2$, $N_3$ has four "corresponding" partials $P_0$, $P_1$, $P_2$, and $P_3$. That is, each partial has a position in a vector such that $P_0(n)$ has the same position in its vector on processor n as $P_0$ (n+1) in its vector on processor n+1. The suffix (n) is used to denote the processor in which the partial resides—thus $P_0(0)$ is the partial $P_0$ on processor $N_0$. In a reduce-scatter pass, corresponding partials are reduced and the reduction provided to one of the processors. For example, partials $P_0(0)$, $P_0(1)$, $P_0(2)$, $P_0(3)$ are reduced (to $r_0$) and placed onto processor $N_0$. Similarly, partials $P_1(0)$, $P_1(1)$, $P_1(2)$ and $P_1(3)$ are reduced (to $r_1$) and placed onto processor $N_1$. And so forth so that in an intermediate state S2, each processor has one of the reductions $r_0$, $r_1$, $r_2$ and $r_3$. As explained, the reduction may be by any combinational function f ($Pi_0^3$)—which could include independent operators (e.g. max) or associative operators=$P_1$ ($N_0$)*$P_1(N_1)$*$P_1(N_2)$*$P_1(N_3)$. Then, in an all-gather pass, each reduction is provided to all processors to activate a state S3 wherein each processor now holds all four reductions. Note that in S1, the "corresponding" partials, e.g. $P_0(0)$, $P_0(1)$, $P_0(2)$ and $P_0(3)$ may all differ whereas, in state S3, each reduction, e.g. $r_0$ is the same at all processors, where $r_i=f\{(P_i(0), P_i(1), P_i(2)$ and $P_i(3))\}$. In machine learning, the set of partial values $P_0$, $P_1$, $P_2$, $P_3$ is a vector. A vector of partials (e.g. updated weights) is produced on each pass of the model during training. The reduction $r_0$, $r_1$, $r_2$, $r_3$ on each processor in state S3 is the full reduction vector. In the context of machine learning, each partial could be a set of updating deltas for a parameter in the model. Alternatively (in an arrangement not described further herein) it could be an updated parameter.

Therefore, as noted an example all-reduce operation includes a reduce-scatter operation, followed by an all-gather operation. During the reduce-scatter operation, each node exchanges different elements of the partial. When the reduce-scatter is complete, all nodes have one nth of the final all-reduce. During the all-gather, each node receives an additional 1/n of the final all-reduce until, after n−1 steps, all of the nodes have the complete data set.

Figure 3A:
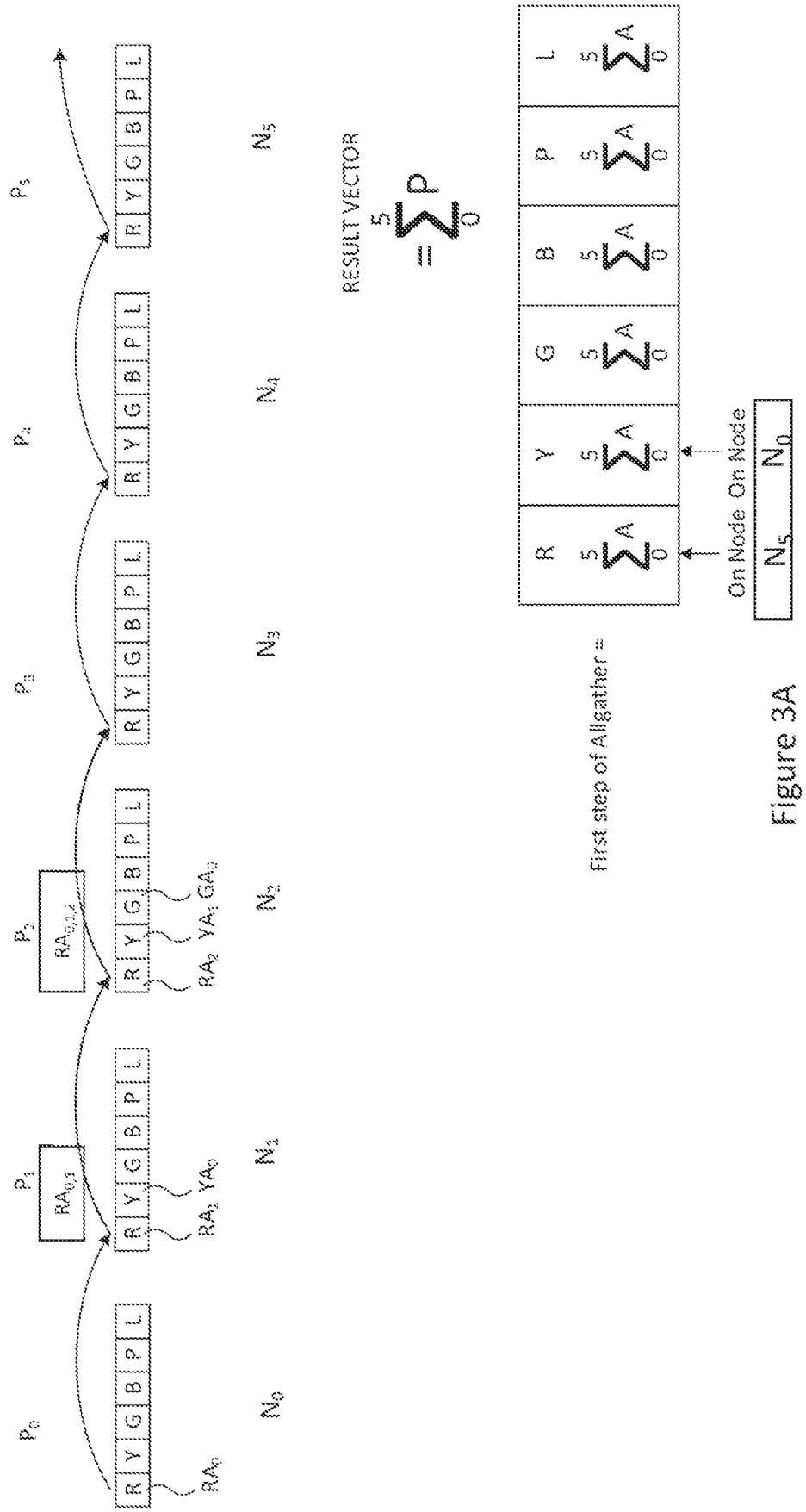
FIG. 3A is a schematic diagram of a stage of a reduce-scatter operation.
Figure 3B:
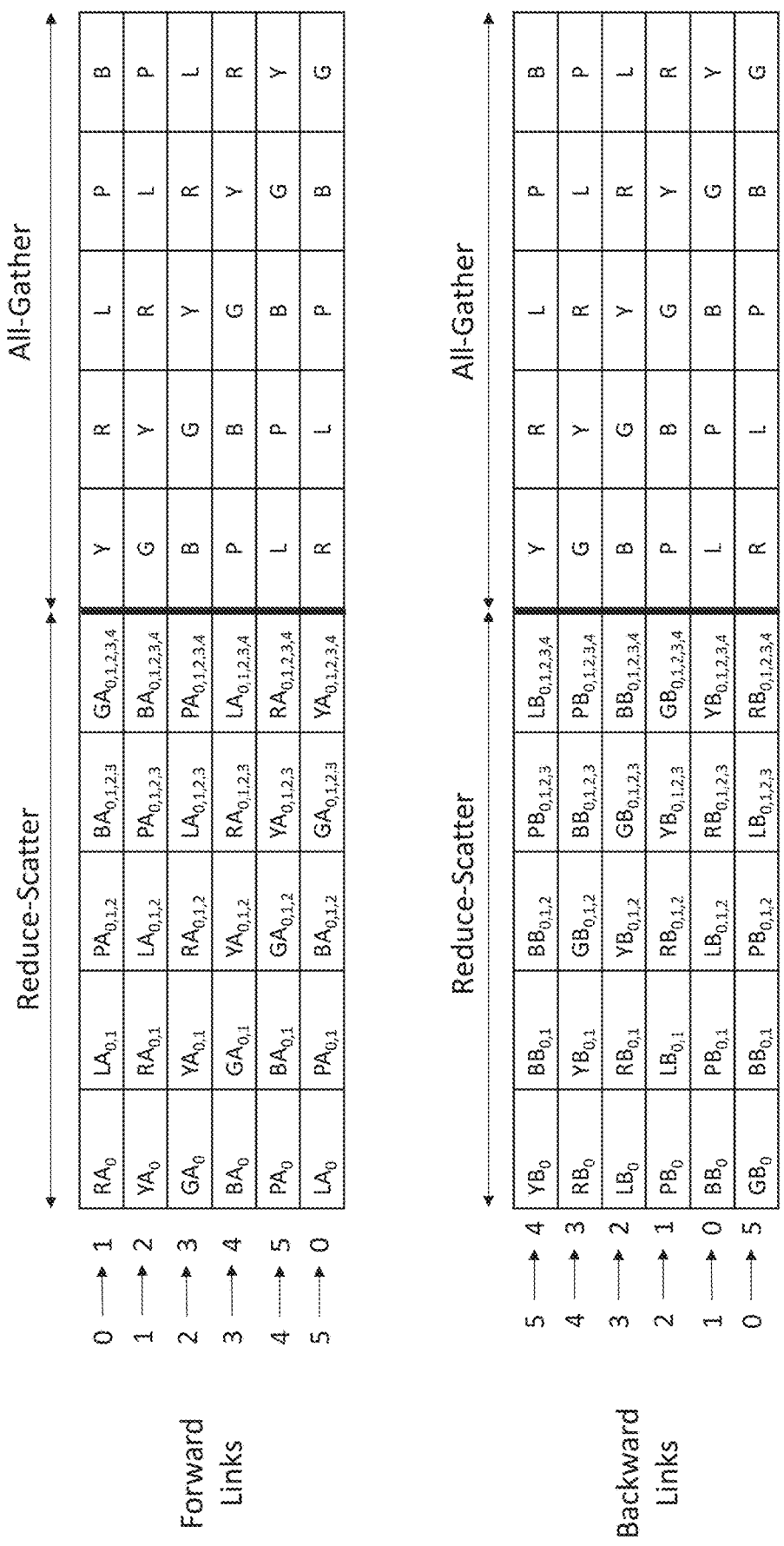
FIG. 3B is a schematic diagram of timing of operations in an all-reduce operation.

FIGS. 3A and 3B illustrate an example of reduce-scatter/all-gather using six "virtual" ID rings. These are also termed "logical" rings herein. FIG. 3A is a schematic diagram illustrating the reduction of partials in multiple virtual rings. Each partial is split into six fragments. In FIG. 3A, the capital letters R, Y, G, B, P, L each denote a different fragment of a partial stored at each processor. The letters denote corresponding fragments which are to be reduced with each other, and define the "virtual" or "logical" ring for those fragments. Looking at FIG. 3A, the "R" fragments in each of the partials $P_0$, $P_1$, $P_2$, $P_3$, $P_4$, and $P_5$ are reduced into a single fragment in the result vector ($R\Sigma A_0^5$). Similarly for the Y, G, B, P and L fragments.

FIG. 3B shows a timing diagram with time on the horizontal axis indicating the data exchanges and computations in each step of the all-reduce process. In FIGS. 3A and B, the all-reduce process is accomplished by a reduce-scatter phase followed by an all-gather phase.

The notation in FIGS. 3A and 3B is as follow. The partials are each denoted $P_0$, $P_1$, $P_2$, $P_3$, $P_4$, and $P_5$. At the start of the process, each partial is stored on a respective processor $N_0$, $N_1$, $N_2$, $N_3$, $N_4$, $N_5$. Each fragment is labelled according to its fragment ordinant and its position in the virtual ring in which it is deemed to be reduced. For example, $RA_0$ denotes the R fragment in partial $P_0$, because this is the first fragment in a virtual ring formed by processors $N_0$-$N_1$-$N_2$-$N_3$-$N_4$-$N_5$. $RA_1$ denotes the R fragment calculated at processor $N_1$, which is in the second position in its virtual ring. $YA_0$ denotes the Y fragment calculated at processor $N_1$. The "0" suffix indicates it is the first fragment in its virtual ring, the Y-ring being $N_1$-$N_2$-$N_3$-$N_4$-$N_5$-$N_0$. Note, in particular, that the suffixes on A reflect the virtual rings, and do not correspond to the physical processors (or the partials). Note that FIG. 3A shows only the virtual rings on the forward links. FIG. 3B shows that an equivalent process is occurring on the backward links, with the fragments denoted as B.

In step one, the first fragment (the $A_0$) in each virtual ring is transferred from its processor to the next adjacent processor where it is reduced with the corresponding fragment at that processor. That is, $RA_0$ moves from $N_0$ to $N_1$ where it is reduced with $RA_1$ to form $RA_{0,1}$. The notation 0, 1 indicates that the fragment is formed by the reduction of the first and second fragments in the virtual ring. Note that, in the same step, the $A_0$ fragments of each virtual ring are simultaneously transmitted. That is, the link between $N_1$ and $N_2$ is used to transmit $YA_0$, the link between $N_2$ and $N_3$ is used to transmit $GA_0$, et cetera. In the next step, the corresponding reduced fragments are transmitted over the forward links to their next adjacent processor. For example, $RA_{0,1}$ is transmitted from $N_1$ to $N_2$, and $YA_{0,1}$ is transmitted from $N_2$ to $N_3$. Note that for reasons of clarity, not all fragments in FIG. 3A are numbered. The full set of fragments and numbers are shown in FIG. 3B. This process carries on for five steps. After five steps, there is a reduction of all fragments on each processor. At the end of the fifth step, this reduction is on the last processor of each corresponding ring for that fragment. For example the R reduction is on processor $N_5$.

The beginning of the all-gather phase starts by a transmission from the last to the first processor in each virtual ring. Thus, the final reduction for the R fragments ends on processor $N_5$ ready for the first step of the all-gather phase. The final reduction of the Y fragments correspondingly ends up on the processor $N_0$. In the next step of the all-gather phase, the reduced fragments are transmitted again to their next adjacent processor. Thus the fully reduced R fragment is now also at $N_2$, the fully reduced Y fragment is now also at $N_3$ and so on. In this way, each processor ends up at the end of the all-gather phase with all fully reduced fragments R, Y, G, B, P, L of the partial.

Example embodiments of the disclosure can be applied to control the exchange of data in a machine learning context. Specifically, example embodiments can be applied to control the exchange of data during a reduce-scatter operation described above with respect to FIGS. 2, 3A, and 3B.

Figure 5:
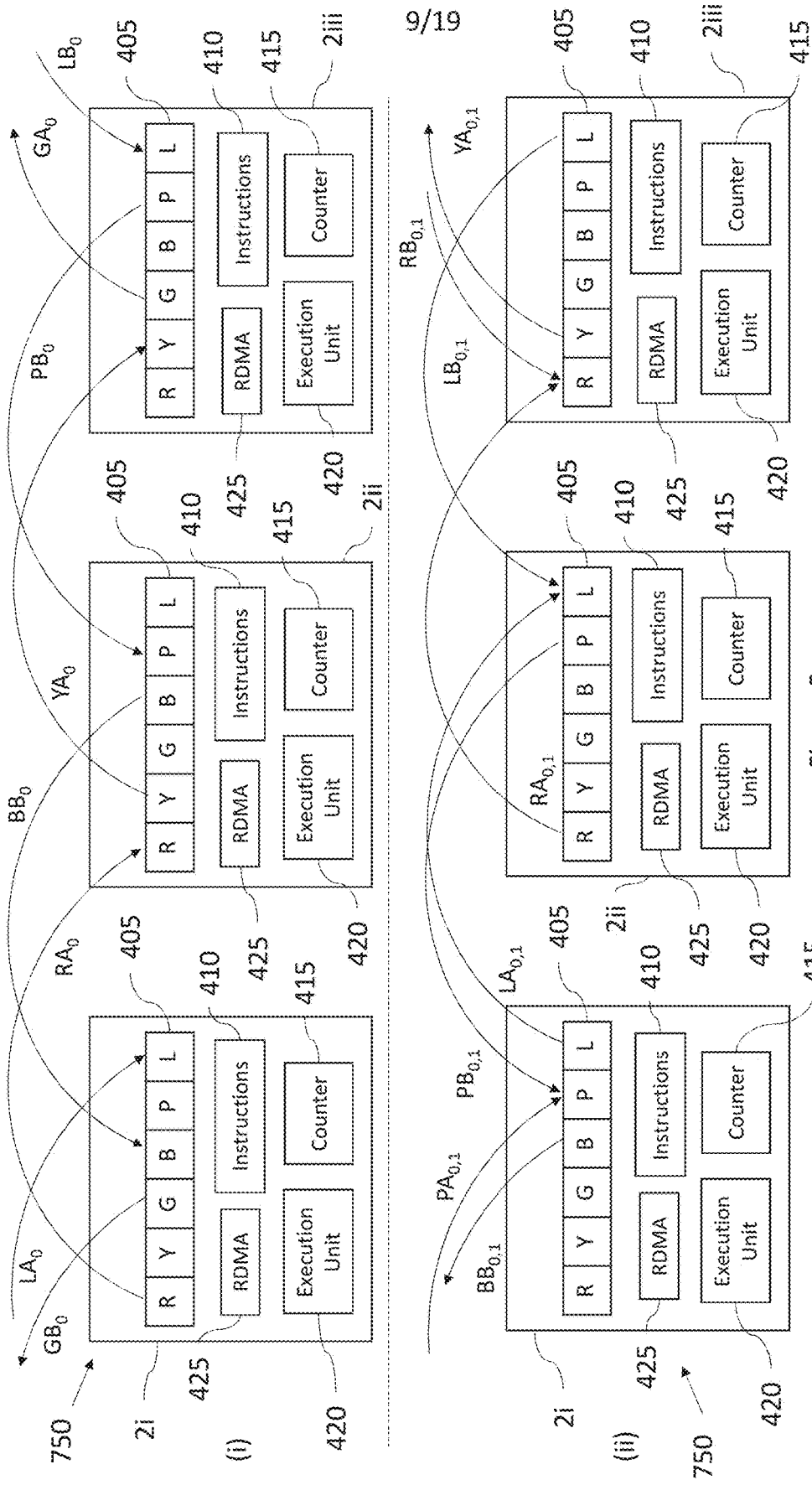
FIGS. 5 and 5A is a schematic diagram of the use of a counting circuitry to control the transfer of data in a reduce-scatter operation.

FIG. 5 illustrates part of a reduce-scatter operation carried out between processors 2 of computer system 750 (which is described above with respect to FIGS. 4 and 4A). Even though the techniques discussed with respect to FIG. 5 are in the context of delta weights exchanged in a reduce-scatter process, the technique described of using the counting circuitry to control data transfer is more broadly applicable to other types of data exchanged. Each of the passes of the reduce-scatter operation correspond to one of the exchange stages discussed above with respect to FIGS. 4 and 4A.

The counting circuitry 750 of each of the processors is used to prevent the processor from proceeding to the next pass in the reduce-scatter operation before each of its neighbours has completed certain own data transfer operations in the present pass. Therefore, implicit neighbour synchronisation is achieved, and each of the processors is prevented from running ahead and causing buffer overflow.

The processors 2 of system 750 exchange fragments of partials in the manner illustrated by FIGS. 3A and 3B. The processor 2$i$ corresponds to node $N_0$, the processor 2$ii$ corresponds to Node $N_1$, and the processor 2$iii$ corresponds to Node $N_2$. The full computer system 750 may include six processors 2 as shown for the Reduce-Scatter operation in FIGS. 3A and 3B. However, for reasons of simplification, only three processors are shown.

Figure 5A:
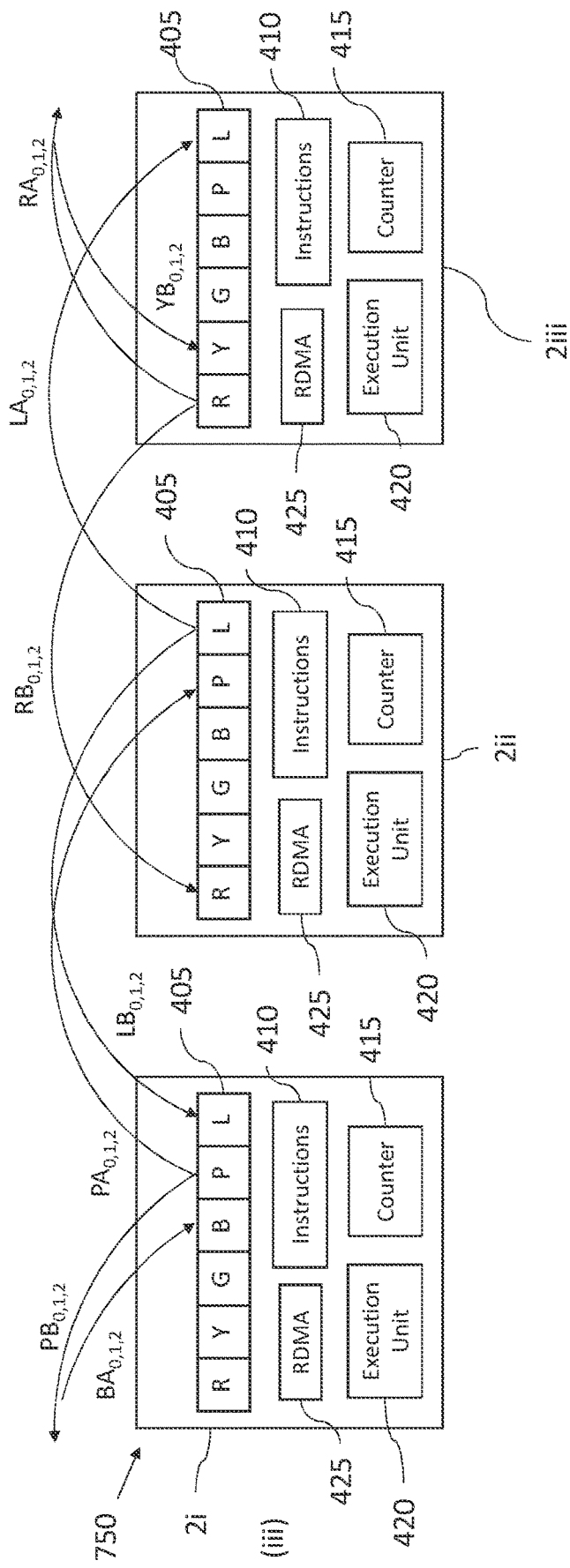

In the data memory 405 of each of the processors 2, is stored a partial comprising a plurality of fragments, stored at locations labelled R, Y, G, B, P, L. Each of the data fragments is a subset of the delta values calculated by each processor using its training data. These data fragments correspond to the data fragments shown in FIGS. 3A and 3B. The top half of FIG. 5 illustrates the exchange of fragments between processors 2 during a first pass, labelled (i), of the reduce-scatter operation. The bottom half of FIG. 5 illustrates the exchange of fragments between processors 2 during a second pass, labelled (ii), of the reduce-scatter operation. FIG. 5A illustrates the exchange of fragments between processors 2 during a third pass, labelled (iii), of the reduce-scatter operation. Therefore, the communication between processors is executed with communication barriers enforced between each of the passes. This means that one processor doesn't start sending data for the next pass before it has received certain data from its neighbour.

During the first pass, the data fragment $GB_0$ is transferred from processor 2$i$ to a processor (not shown) corresponding to the node $N_5$ shown in FIG. 3A. Also, during the first pass, the processor 2$i$ transfers the data fragment $RA_0$ to processor 2$ii$. The counting circuitry 415 of the processor 2$ii$ is configured to count the amount of data of at least part of fragment $RA_0$ received, so as to determine when the at least part of fragment $RA_0$ has been received. Upon receipt of the data of fragment $RA_0$, the processor 2$ii$ reduces the data of fragment $RA_0$ with the data of fragment $RA_1$ (held in its own data memory 405) to form fragment $RA_{0,1}$.

Also during the first pass, the processor 2$ii$ receives the data fragment $PB_0$ from the processor 2$iii$. The counting circuitry 415 of the processor 2$ii$ is configured to count the amount of data of at least part of fragment $PB_0$ received, so as to determine when the at least part of fragment $PB_0$ has been received. Upon receipt of the data of fragment $PB_0$, the processor 2$ii$ reduces the data of fragment $PB_0$ with the data of fragment $PB_1$ to form data of fragment $PB_{0,1}$.

Once the counting circuitry 415 of processor 2$ii$ determines that the at least part of data fragments $RA_0$ and $PB_0$ have both been received at the processor 2$ii$, the processor 2$ii$ determines to start transmitting the reduced fragments $RA_{0,1}$ and $PB_{0,1}$ during the second pass. During the second pass, the processor 2$ii$ transfers the fragment $RA_{0,1}$ to processor 2$iii$ and fragment $PB_{0,1}$ to processor 2$i$. The processor 2$ii$, during the second pass, also receives the fragment $LA_{0,1}$ from processor 2$i$ and the fragment $LB_{0,1}$ from processor 2$iii$. The counting circuitry 415 of processor 2$ii$ will carry out a similar counting process as carried out for fragments $RA_0$ and $PB_0$ to determine when at least part of the fragments $LA_{0,1}$ and $LB_{0,1}$ are received at the processor 2$ii$ and, therefore, when the processor 2$ii$ can proceed to the third pass.

During the third pass, shown in FIG. 5A, the processor 2$ii$ transfers the fragment $LA_{0,1,2}$ to processor 2$iii$, and fragment $LB_{0,1,2}$ to processor 2$i$. The processor 2$ii$, during the second pass, also receives the fragment $PA_{0,1,2}$ from processor 2$i$ and the fragment $RB_{0,1,2}$ from processor 2$iii$. The counting circuitry 415 of processor 2$ii$ will carry out the counting process to determine when at least part of the fragments $PA_{0,1,2}$, $RB_{0,1,2}$ are received at the processor 2$ii$ and, therefore, when the processor 2$ii$ can proceed to the fourth pass (not shown).

A counting process is carried out for the received fragments at each processor 2, so as to determine when at least part of the fragments for a particular pass are received. This ensures that none of the processors 2 run ahead of the other processors 2 and causes overflow of the memory 405 of their neighbours.

That the scheme shown in FIGS. 5 and 5A prevents overflow of memory can be seen by considering the control of data transfer of processor 2$i$ in dependence upon the data received from processor 2$ii$. As shown in FIG. 5, the processor 2$i$ transfers the fragment $RA_0$ to processor 2$ii$ during the first pass. The processor 2$iii$, during the same pass, transfers the fragment $PB_0$ to the processor 2$ii$. The processor 2$ii$ reduces the fragment $RA_0$ with the fragment $RA_1$ to produce fragment $RA_{0,1}$. The processor 2$iii$ reduces the fragment $PB_0$ with the fragment $PB_1$ to produce the fragment $PB_{0,1}$. During the second stage, the processor 2$ii$ transfers the fragment $RA_{0,1}$ to processor 2$iii$ and the fragment $PB_{0,1}$ to processor 2$i$. In order to avoid running ahead in the process and proceeding to the third pass, the processor 2$i$ first determines whether the processor 2$ii$ has calculate and transferred at least part of the reduced fragments $RA_{0,1}$, $PB_{0,1}$, and therefore, a new fragment $PA_{0,1,2}$ may be transferred to the processor 2$ii$, without overwriting data that is still required in memory 405. The processor 2$i$ makes this determination by its counting circuitry 415 counting the amount of data in fragment $PB_{0,1}$ received from the processor 2$ii$ to determine when the processor 2$ii$ has reached a relevant point its data transfer operations for the second pass. In response to determining that processor 2$ii$ has reached this point, the processor 2$i$ transfers the fragment $PA_{0,1,2}$ to processor 2$ii$ without causing overflow of memory 405.

In FIGS. 4, 4A, 5, and 5A, each of the processors 2 is illustrated as having a single execution unit 420, a single counter 415, and a unified data memory 405, unified instruction memory 410, and single RDMA controller 425. However, each processor 2 may comprise a plurality of processors, which are referred to herein as tiles. In this case, each tile has its own execution unit, counting circuitry, instruction memory, data memory, and RDMA controller. A multi-tile arrangement in which embodiments may be implemented is described in U.S. patent application Ser. No. 15/886,315, which is incorporated by reference. Each tile comprises its own counting circuitry that can be used to count bytes received from a tile on a different processor, and, in dependence upon this count, determine when to pass control to another tile on the processor. By withhold the passing of control to another tile until the expected data is received, barriers can be imposed at certain points in the overall data transfer process to prevent certain tile from running ahead.

Figure 6:
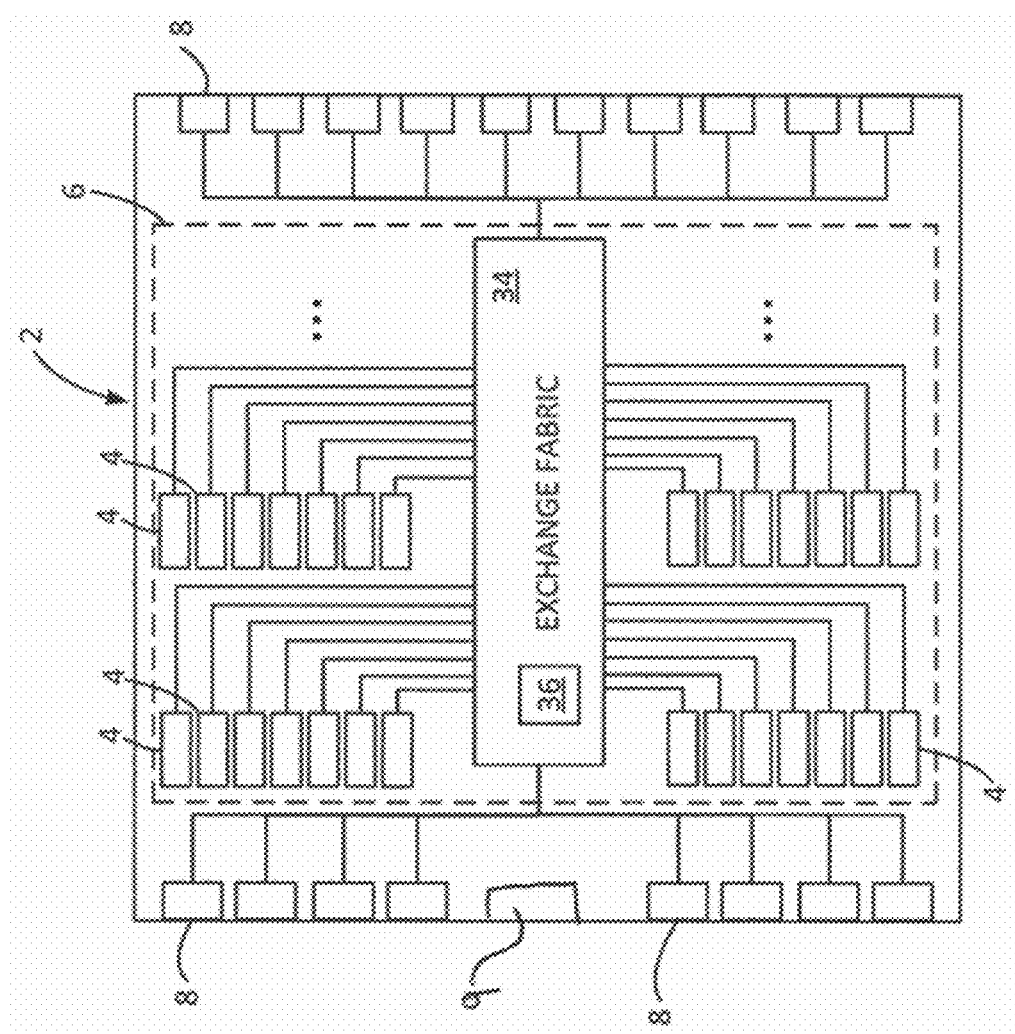
FIG. 6 is a schematic diagram of a multi-tile processor.

Reference is made to FIG. 6, which illustrates an example of a multi-tile processor 2. The processor 2 comprises an array 6 of multiple processor tiles 4 and an interconnect 34 connecting between the tiles 4. The processor 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of a processor and memory. For instance, by way of illustration the processor 2 may comprise of the order of hundreds of tiles 4, or even over a thousand. For completeness, note also that an "array" as referred to herein does not necessarily imply any particular number of dimensions or physical layout of the tiles 4.

In embodiments, each processor 2 also comprises one or more external links 8, enabling the processor 2 to be connected to one or more other processors (e.g. one or more other instances of the same processor 2). These external links 8 may comprise any one or more of: one or more processor-to-host links for connecting the processor 2 to a host processor, and/or one or more processor-to-processor links for connecting together with one or more other instances of the processor 2 on the same IC package or card, or on different cards. In one example arrangement, the processor 2 receives work from a host processor (not shown) which is connected to the processor via one of the processor-to-host links in the form of input data to be processed by the processor 2. Multiple instances of the processor 2 can be connected together into cards by processor-to-processor links. Thus a host accesses a computer, which is architected as a multi-tile system on a chip, depending on the workload for the host application.

The interconnect 34 is configured to enable the different tiles 4 in the array 6 to communicate with one another. However, as well as there potentially being dependencies between threads on the same tile 4, there may also be dependencies between the portions of the program running on different tiles 4 in the array 6. A technique is, therefore, employed to prevent a piece of code on one tile 4 running ahead of data upon which it is dependent being made available by another piece of code on another tile 4.

Each tile 4 is itself a processor capable of executing instructions (code) from a local instruction memory and handling data in local data memory. A tile 4 may comprise a respective instance of a barrel-threaded processor and a memory. For instance, by way of illustration the processor 2 may comprise of the order of hundreds of tiles 4, or even over a thousand. For completeness, note also that an "array" as referred to herein does not necessarily imply any particular number of dimensions or physical layout of the tiles 4.

Communication between tiles 4 on the processor 2 occurs in a time deterministic fashion. However, other forms of inter tile exchange are possible. There may be dependencies between the portions of the program running on different tiles 4 in the array 6. That is, processing data on one tile may depend on results from another tile, e.g. may provide results on which another tile depends. A technique is, therefore, employed to prevent a piece of code on one tile 4 running ahead of data upon which it is dependent being made available by another piece of code on another tile 4.

Parallel programming models for AI and Data Science usually follows a 3-phase iterative execution model: Compute, Barrier, and Exchange. The implications are that data transfer to and from a processor is usually barrier dependent to provide data-consistency between the processors and between each processor and a host. Typically used data consistency models are Bulk Synchronous Parallel (BSP), Stale Synchronous Parallel (SSP) and Asynchronous. Embodiments described herein use a BSP model, but it will be apparent that the other synch models could be utilised as an alternative.

Figure 6A:
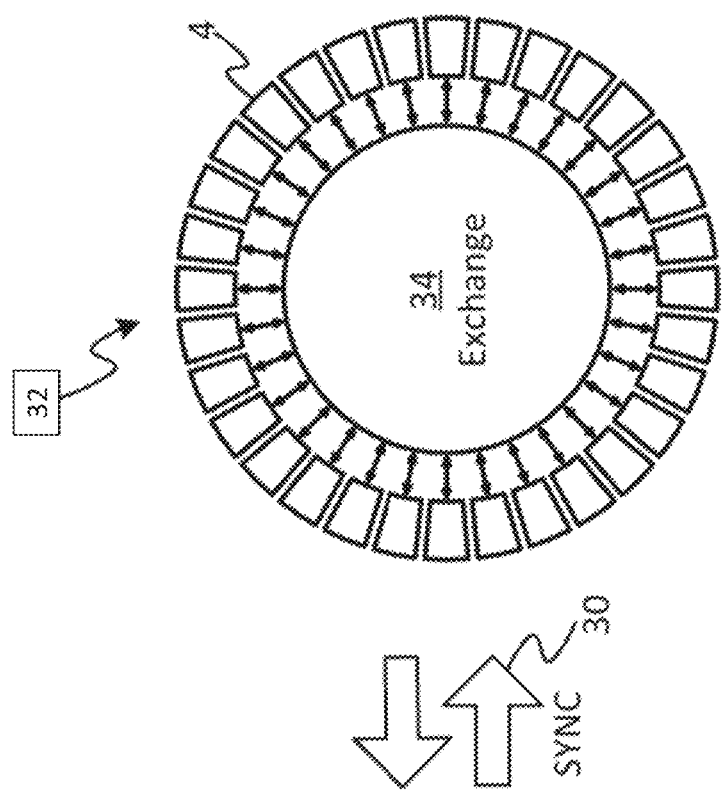
FIG. 6A is a schematic diagram illustrating the compute and exchange phases within a multi-tile processor.
Figure 6A:
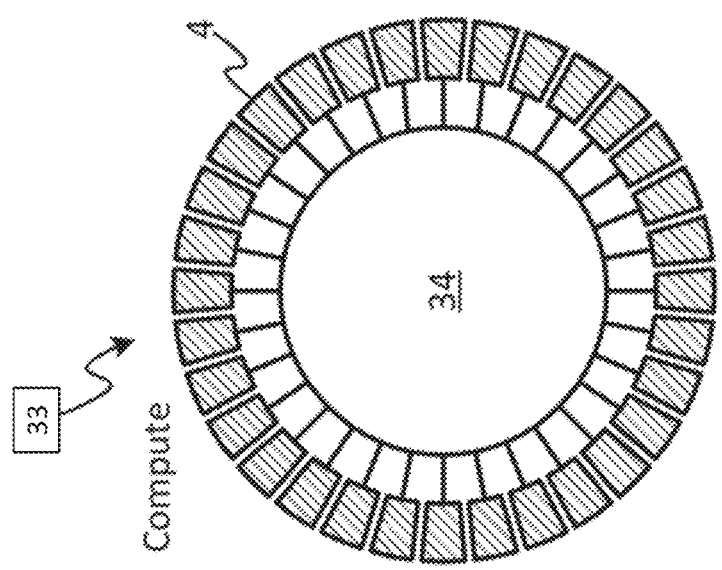
Figure 6B:
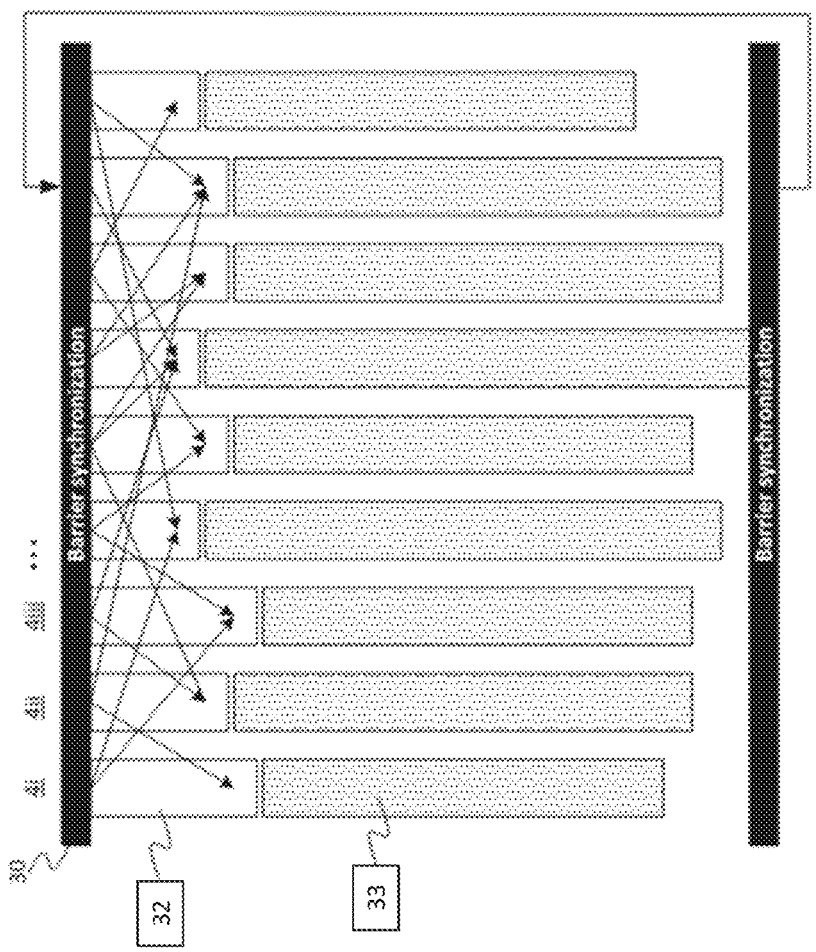
FIG. 6B illustrates exchange of data in a bulk synchronous parallel system.

Reference is made to FIGS. 6A and 6B, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 5 and 6, a barrier synchronization is placed between each compute phase 33 and the following exchange phase 32. The barrier placed between the exchange and compute phases is not be confused with the barrier between exchange stages shown in FIGS. 4, 4A, 5, and 5A.

During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles, but does not perform any new computations until it has received from other tiles 4 any data on which its task(s) has/have dependency. Neither does it send to any other tile, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processor 2 or different processors could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 6B illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that in this arrangement, some tiles 4 are allowed to begin computing 33 whilst some others are still exchanging.

Figure 6C:
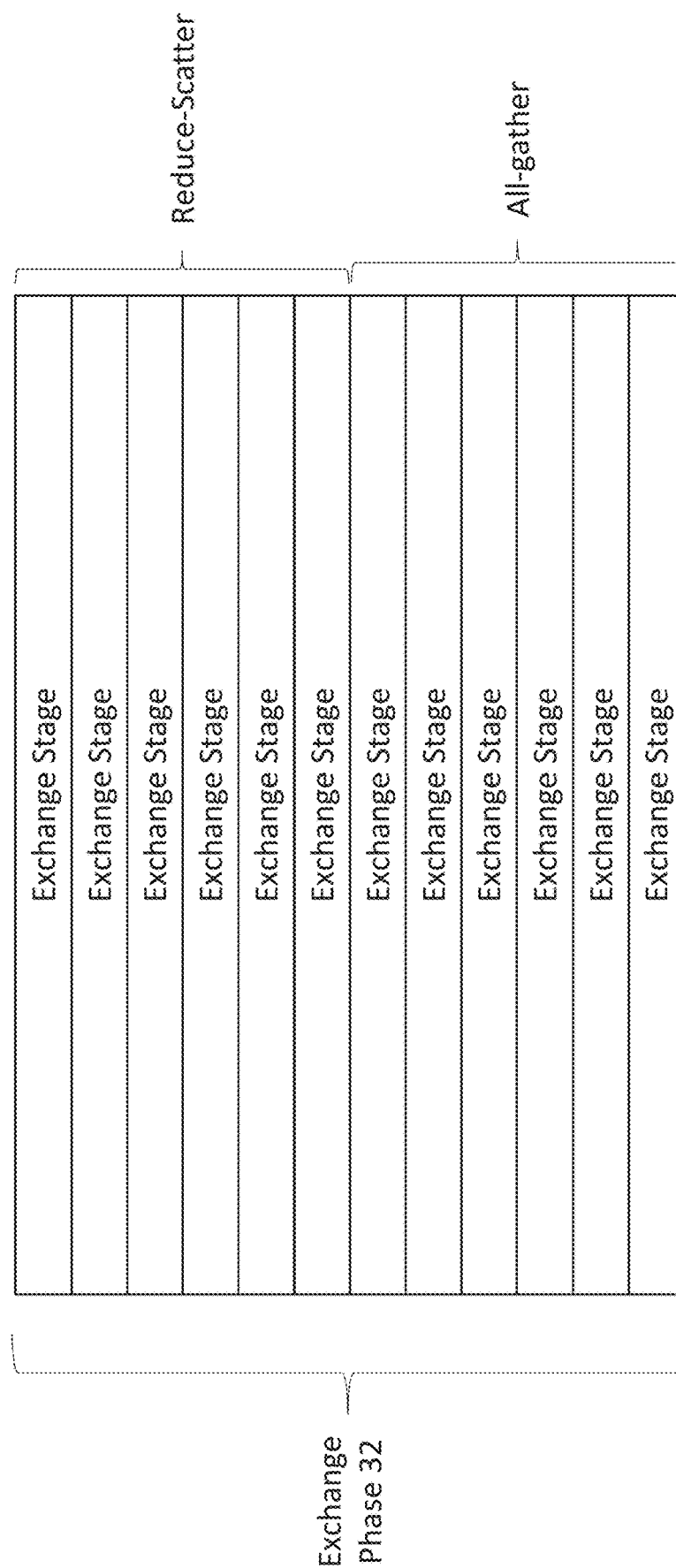
FIG. 6C illustrates the relationship between an exchange phase and the exchange stages.

The relationship between the exchange stages discussed above with reference to FIGS. 4 and 4A and the exchange phase 32 shown in FIG. 6A is illustrated in FIG. 6C. As shown, an exchange phase 32 comprises a plurality of exchange stages. To complete a full Allreduce operation during an exchange phase 32, the exchange phase 32 may comprise 12 exchanges stages in the case that there are 6 processor in the system. 6 of these exchange stages are allocated for performing a reduce-scatter operation, with each stage being allocated for a pass of the reduce-scatter operation. 6 of the exchange stages are allocated for performing an All-gather operation, with each stage being allocated for a pass of the All-gather operation.

The communication between tiles 4 on a processor 2 occurs in time deterministic fashion in which data packets are transmitted without headers. This is explained in our earlier application U.S. patent application Ser. No. 15/886,315.

Figure 7:
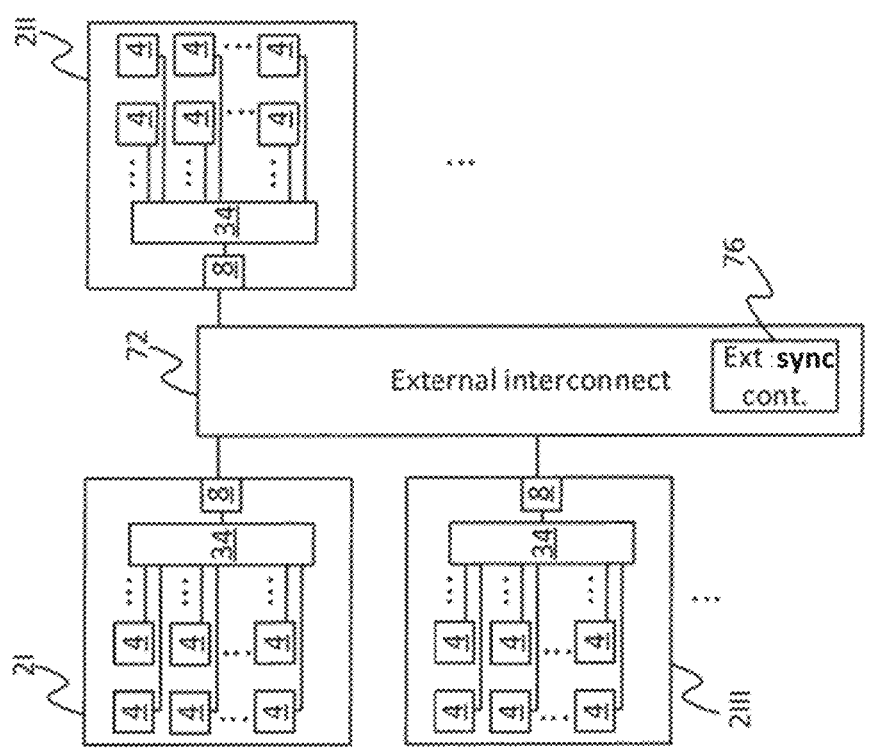
FIG. 7 illustrates the arrangement of multi-tile processors in a computer.

In embodiments, multiple instances of the processor 2 are connected together to form an even larger array of tiles 4 spanning multiple processors 2. This is illustrated in FIG. 7. The processors 2 are connected together by an external interconnect 72 (via the external links 8 shown in FIG. 7). This may connect between processors 2 on the same IC package, different IC packages on the same card, and/or different IC packages on different cards. As well as providing a conduit for exchange of data between tiles 4 on different processors, the external interconnect 72 also provides hardware support for performing barrier synchronization between the tiles 4 on different processors 2 and aggregating the local exit states of the tiles 4 on the different processors 2.

Figure 8:
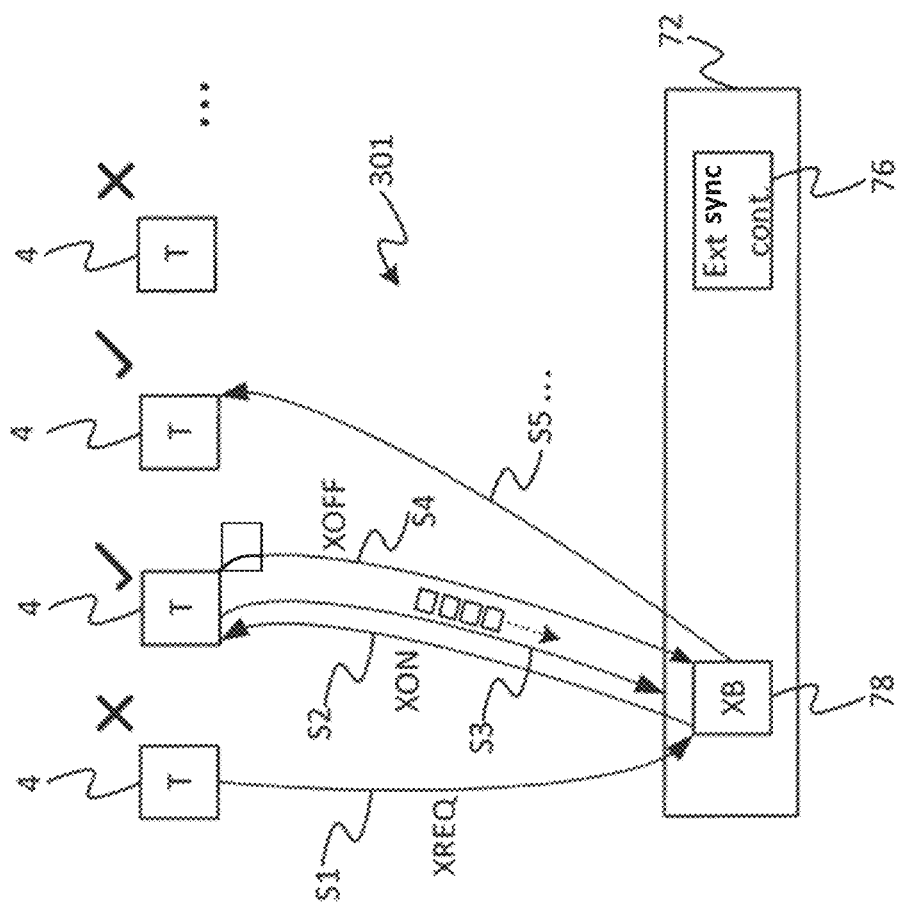
FIG. 8 illustrates the exchange of data packet between tiles in a computer.

FIG. 8 illustrates an exemplary mechanism for communicating between processors 2 (external exchange). This mechanism is non-time-deterministic. The mechanism is implemented in dedicated hardware logic in the external interconnect 72. Data is sent over the external interconnect 72 in the form of packets. Unlike the packets sent over the internal interconnect 34, these packets have headers: as the order of transmission can change, they use a destination address in the packet header. The external interconnect 72 includes a routing table for statically routing the data packets between the different processors in dependence upon the headers of the data packets.

At the physical layer, the interconnect mechanism is lossy, but at the transaction layer, the mechanism is not lossy due to the architecture of the link layer: if a packet is not acknowledged it will be resent automatically by the hardware in the interconnect 72. The possibility for loss and resending at the data link layer, however, means that the delivery of data packets over the external interconnect 72 is not time-deterministic. Further, the packets of a given exchange may arrive together or separated apart in time, and in any order, so the external interconnect employs flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 72 comprises an external exchange block (XB) 78. The compiler nominates one of the tiles 4 to send an external exchange request (XREQ) to the exchange block 78 (operation S1). The XREQ is a message comprising one or more control packets, indicating which of the tiles 4 have data packets (content) to send to another tile or tiles 4 on another processor 2. This is illustrated schematically in FIG. 8 by the ticks and crosses: by way of an example scenario, those labelled with a tick have data packets to send externally and those labelled with a cross do not. In operation S2, the exchange block 78 sends an exchange-on (XON) control packet to a first of the tiles 4 with data to send externally. This causes the first tile to start sending its packets to the relevant destination via the external interconnect 78 (operation S3). The data packets received from the first tile at the external interconnect are statically routed to the destination using a routing table in the external interconnect 78. If at any time, the XB 78 is unable to continue sending packets to the interconnect (e.g. due to a previous packet loss and re-transmission in the interconnect, or due to over-subscription of the external interconnect by many other XBs and tiles) the XB 78 will send an exchange-off (XOFF) to that tile before the XBs queue overflows. Once the congestion is cleared and the XB 78 again has sufficient space in its queue it will send an XON to the tile allowing it to continue transmitting its content. Once this tile 4 has sent its last data packet, then in operation S4, the tile 4 sends an exchange-off (XOFF) control packet to the XB 78. In response, the XB 78, in operation S5 sends another XON to the next tile 4 with data packets to send, and so forth. Therefore, control over the sending is passed between tiles by the signalling of XON and XOFF between the tiles 4 and the dedicated hardware logic in the form of the external exchange block 78.

Figure 10:
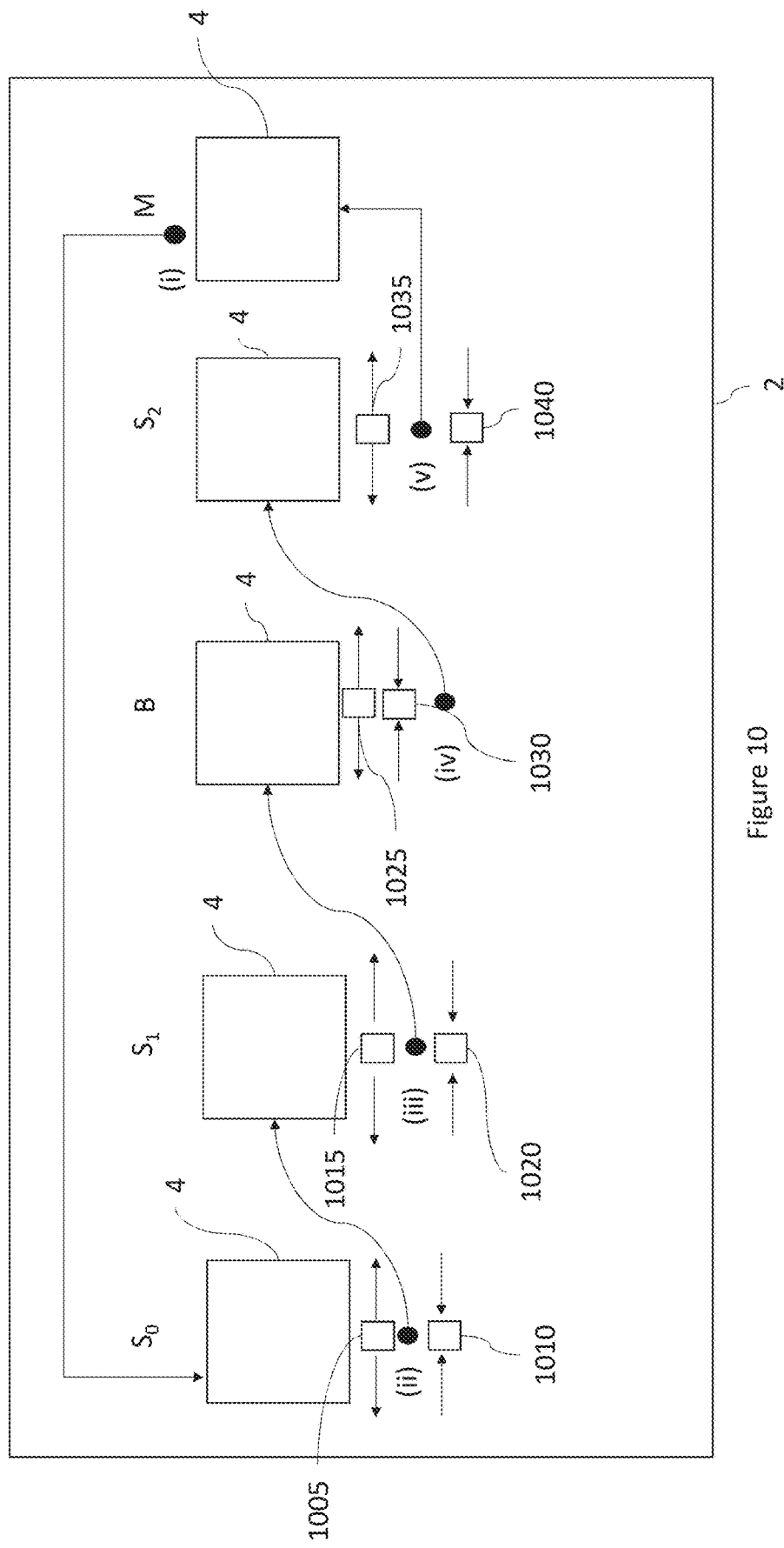
FIG. 10 illustrates the passing of control between different tile types in a multi-tile processor in which there is one synchronisation per exchange stage.

Reference is made to FIG. 10, which illustrates how the individual tiles 4 of a processor 2 may operate to perform the control of data transfer according to embodiments of the application.

Each of the tiles 4 in the processor 2 has certain data, which it has produced, to send to tiles on one or more other processors. In this example, each of the tiles sends and receives data to and from two processors. However, it would be appreciated by the skilled person that other numbers of processors are possible. The data that is sent by a tile comprises one or more units of data, where each unit of data is sent to a different one of the one or more processors. A unit of data is considered to be part of a data item as discussed above with respect to FIGS. 4 and 4A. The unit of data may, for example, be a part of a data fragment of a partial. The term 'unit of data' is taken to mean a set of data that is stored and sent by a single tile, and no limitation regarding the format of the data is intended. Each unit of data may be sent to one or more tiles on one or more other processors in one or more addressed data packets, in the manner discussed above with reference to FIG. 8.

Only one of the tiles 4 in the processor 2 is able to send its data at any given time. A tile 4 is configured to send its data when it has 'control'. A tile 4 may receive control by receiving an XON message, and may relinquish control by sending an XOFF message as discussed above with respect to FIG. 8. Control is passed between the tiles, so that all of the tiles perform their respective operations sequentially. A tile passes control to another tile in dependence upon certain conditions being met. The conditions to be met depend upon the type of tile.

Each pass of control through the sequence of tiles corresponds to an exchange stage as discussed previously.

A first type of tile 4 defined is referred to herein as a bachelor tile. The bachelor tile in FIG. 10 is labelled with 'B'. A processor has at least one bachelor tile. Each bachelor tile is configured to send its data when it receives control. The bachelor tile B then waits until it receives data from other tiles on different processors. Once the data is received from the other processors 2, the respective bachelor tile then passes control to another tile 4 in the processor 2. In preferred embodiments, the traffic is bidirectional, i.e. each processor 2 receives data from two other processors. The bachelor tile B waits until the predefined amount of data is received from both processors before moving passing control to another tile 4 in the processor.

A second type of tile defined is referred to herein as a student tile. The student tiles in FIG. 10 are labelled as '$S_0$' and '$S_1$'. A student tile is configured to send its data when it receives control. The student tile does not wait until it receives data from another tile on a different processor before passing control to another tile. Rather, after the student tile sends its data to one or more other processors of the plurality of processors, the student tile passes control to another tile. The student tile will also receive data from one or more other tiles on one or more other processors 2. In preferred embodiments, the traffic is bidirectional, i.e. each student tile sends data to two other processors and receives data from those two other processors.

A third type of tile defined is referred to herein as a master tile. The master tile in FIG. 10 is labelled as 'M'. The master tile is configured to set up the configuration of tiles. The master tile does not send data or receive data with another processor. The master tile controls which tile/s are students and which tile/s are bachelors. The master tile starts with control, which it then passes to a student or bachelor tile, which will transmit its data.

It is understood from FIG. 10, that the control is passed between the tiles in a sequence. A Barrier is imposed at the bachelor tile, which prevents the control from passing beyond this points in the sequence until the relevant data is received at the bachelor tile. Thereby, the processor 2 is prevented, until certain data is received from the other processors, from moving further along in the exchange process. In particular, the processor is prevent from moving on to the next exchange stage, where control again passes through the sequence of tiles.

Each of the student and bachelor tiles is configured to send and receive data with two of the processors. For example, if processor 2 in FIG. 10 corresponds to processor 2ii in FIG. 4, each of student tiles $S_0$, $S_1$, $S_2$ send and receive data with processors 2i and 2iii. Similarly, bachelor tile B sends and receive data with processors 2i and 2iii FIG. 10, shows the different points at which control is passed between the tiles 4. As shown in FIG. 10, at (i), the master tile passes control to the student tile $S_0$. The Student tile $S_0$ then sends its data 1005 to a tile on each of two processors. Following the sending of the data 1005, the student tile $S_0$ then passes control to the student tile $S_1$ at (ii). The student tile $S_0$ may also receive data 1010 from a tile on each of the two processors. The receipt of data 1010 from the other processors may happen before or after the sending of data 1005 since, until the barrier is reached at the bachelor tile B, there is no precise synchronisation between the different processors.

The student tile $S_1$ receives control from the student tile $S_0$. The student tile $S_1$ then sends its data 1015 to a tile on another processor. Following the sending of the data 1015, the student tile $S_1$ then passes control to the bachelor tile B at (iii). The student tile $S_1$ may also receive a data 1020 from another tile on a different processor. The receipt of data 1020 from the other processor may happen before or after the sending of data 1015 since, until the barrier is reached at the bachelor tile B, there is no precise synchronisation between the respective tiles on different processors.

After receiving control, the bachelor tile 'B' sends its data 1025 to a tile on each of two processors. The bachelor tile 'B' waits for a data 1030 before passing control to another tile. In response to receipt of the data 1030, the tile 'B' passes control at (iv) to student tile '$S_2$'. Although in FIG. 10, the tile B sends the data 1025 prior to receiving the data 1030, in some cases, the data 1030 is received prior to sending the data 1025. Either way, the tile B sends and receives data 1025, 1030, prior to passing control to tile $S_2$.

The student tile $S_2$ receives control from the bachelor tile B. The student tile $S_2$ then sends its data 1035 to a tile on each of two processors. Following the sending of the data 1035, the student tile $S_2$ then relinquishes control at (v). The student tile $S_2$ may also receive a data 1040 from another tile on a different processor. The receipt of data 1040 from the other processor may happen before or after the sending of data 1035.

At (v), the control may be returned back to the student tile $S_0$, which sends further data upon receiving control. The control then passes again through the sequence of tiles—with each tile sending (and, optionally, receiving) further data—until the bachelor tile $B_1$ receives control again.

Since the bachelor tile B waits until data 1030 is received before passing control, barriers are imposed at this point in the sequence of tiles. The processor 2 cannot proceed in sending further data to the other processors, until the respective bachelor tile B has received its data 1030. This prevents the processor 2 from running ahead and sending the data for the next exchange stage before the tile B receives final data sent by the neighbouring processors during the last exchange stage.

The data which is sent to the tiles 4 from another processor are sent by that processor are sent to the tiles 4 in the same order that those tiles are arranged to send data to that other processor. Therefore, when the bachelor tile B receives its data, it is ensured that the transfer of the data from the earlier tiles in the sequence in the respective processors during the exchange stage is complete. In other words, it may be assumed that when data 1030 is received, the data 1010, 1020 is received at the respective tiles 4. Therefore, the processor 2 may proceed to the next exchange stage at least to the point where control is passed to the bachelor tile B again. When transmitting the data in the next exchange stage, buffer overflow in the student tiles preceding the bachelor tile on the other processor is avoided since it is guaranteed that these tiles have already sent their data for the previous exchange stage.

Each of the tiles 4 may physically comprise the same hardware components, but are configured to operate as student, master or bachelor tiles at different times, as and when required by the compiler.

Although the example has been described with only one bachelor tile B in the processor 2, in other examples the sequence of tiles may comprise a plurality of bachelor tiles such that a plurality of barriers are enforced in the sequence.

In some example embodiments, the processor 2, may not comprise any student tiles. In accordance, with embodiments of the application, a processor 2 may be provided in which data is sent and received by one or more bachelor tiles, with no students being present in the processor 2. However, the use of one or more student tiles provides the advantage that the data exchange process is made more rapid, since with the use of the student tile operation, control may be passed from one tile 4 to the next waiting for receipt of data from another processor. If the student tiles $S_0$, $S_1$, $S_2$ in the processor 2 shown in FIG. 10 were replaced with bachelor tiles, additional barriers, requiring data 1010, 1020, 1040 to first be received would be created at those tiles. This would reduce the speed of the overall data exchange process, as opposed to the example embodiments in which numerous tiles function as student tiles, and can send data without a barrier being imposed at each tile 4.

Each of the tiles 4 comprises its own counting circuitry for counting the amount of received data. This counting circuitry is used in the bachelor tiles to determine when to pass control. In order to determine when it is has received the data 1030, the bachelor tile B uses its counting circuitry to count the amount of received data of the data 1030. When the amount of received data meets an expected amount for data in 1030 defined by the compiler, the tiles B determines that the data 1030 has been received. The tile B, then passes control to student tile $S_2$.

Although student tiles $S_0$, $S_1$ do not use counting circuitry to determine when to pass control, each student tile comprises counting circuitry which it uses to determine when it has received data and, therefore, when that data is ready for processing to produce a further data (e.g. a reduced data fragment) for sending during the next exchange stage. For example, in order to determine when it is has received the data 1020, the tile $S_1$ uses its counting circuitry to count the amount of received data of the data 1020. When the amount of received data meets an expected amount for data 1020 defined by the compiler, the tile $S_1$ determines that the data 1020 has been received. The tile $S_1$ then determines a new data (not shown in FIG. 10) for sending in the next exchange stage in dependence upon data 1020. The tile $S_0$ similarly uses counting circuitry to determine when it has received data 1010, and therefore, when to produce a data item for sending in the next exchange stage.

According to an exemplary application of the techniques disclosed herein, each processor 2 is provided with different set of training data for producing delta weights so as to train a machine learning model. In this case, each tile 4 is provided with a different set of training data for producing one or more of the delta weights. Together, all of the tiles 4 of a processor produce a full set of delta weights, which are averaged with the delta weights produced on other processors. The full iteration through a sequence of tiles corresponds to a pass in the reduce-scatter operation discussed above.

Figure 10A:
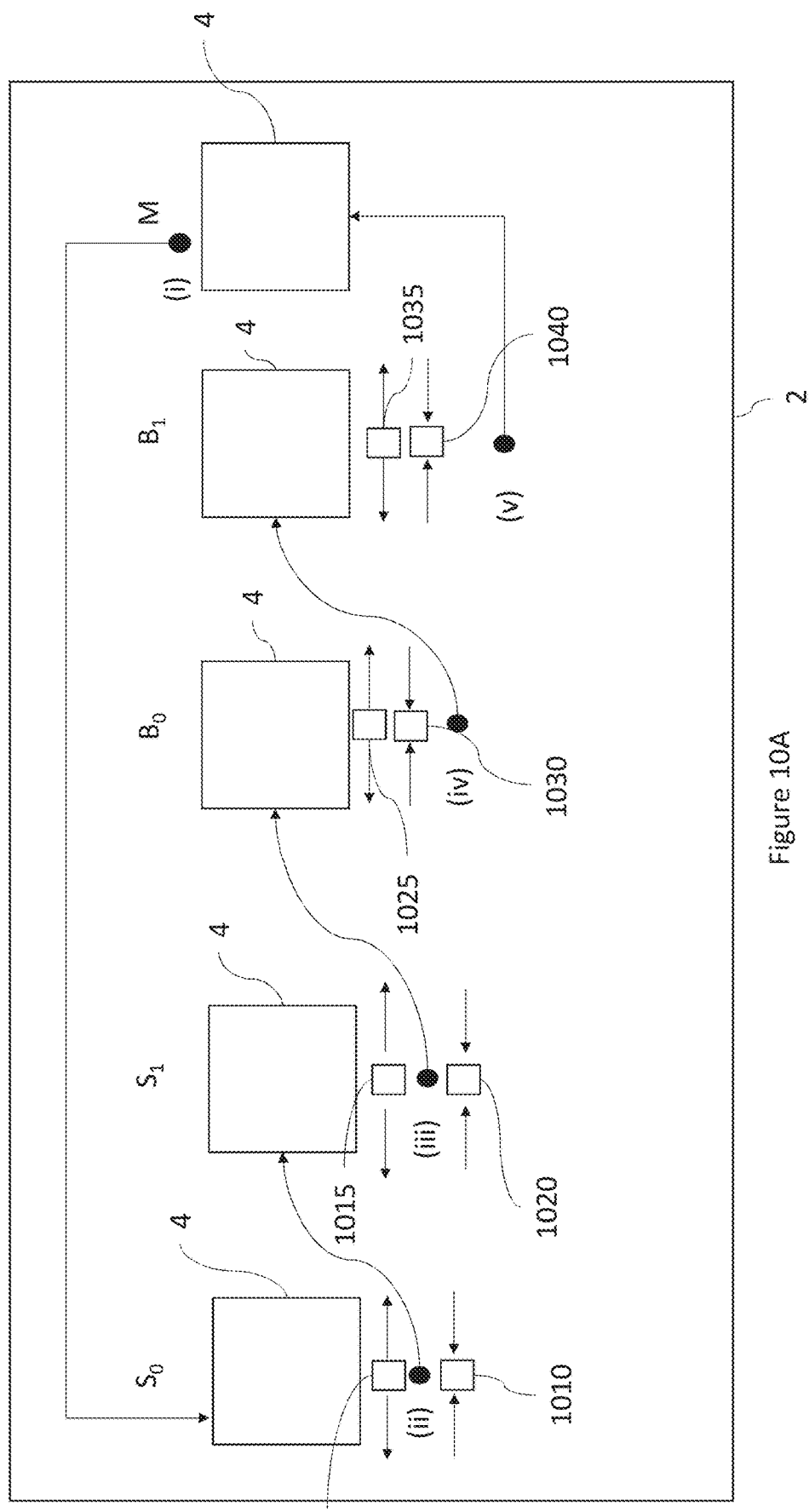
FIG. 10A illustrates the passing of control between different tile types in a multi-tile processor in which there are two synchronisations per exchange stage.

FIG. 10 illustrates a system having only a single implicit barrier per exchange stage. However, as noted two such barriers may be implemented for each exchange stage. Reference is made to FIG. 10A, which illustrates a processor 2 in which two implicit barriers may be implemented per exchange stage. In this case, there are two bachelor tiles $B_0$ and $B_1$. Bachelor tile $B_1$ replaces student tile $S_2$ shown in FIG. 10. Like elements in FIG. 10 are referred to with like reference numerals. In FIG. 10A, a first implicit barrier is imposed at tile $B_0$ since the tile $B_0$ will not pass control until it has received data 1030. Following this, a second implicit barrier is imposed at tile $B_1$, since tile $B_1$ will not pass control until it has received data 1040.

Figure 9:
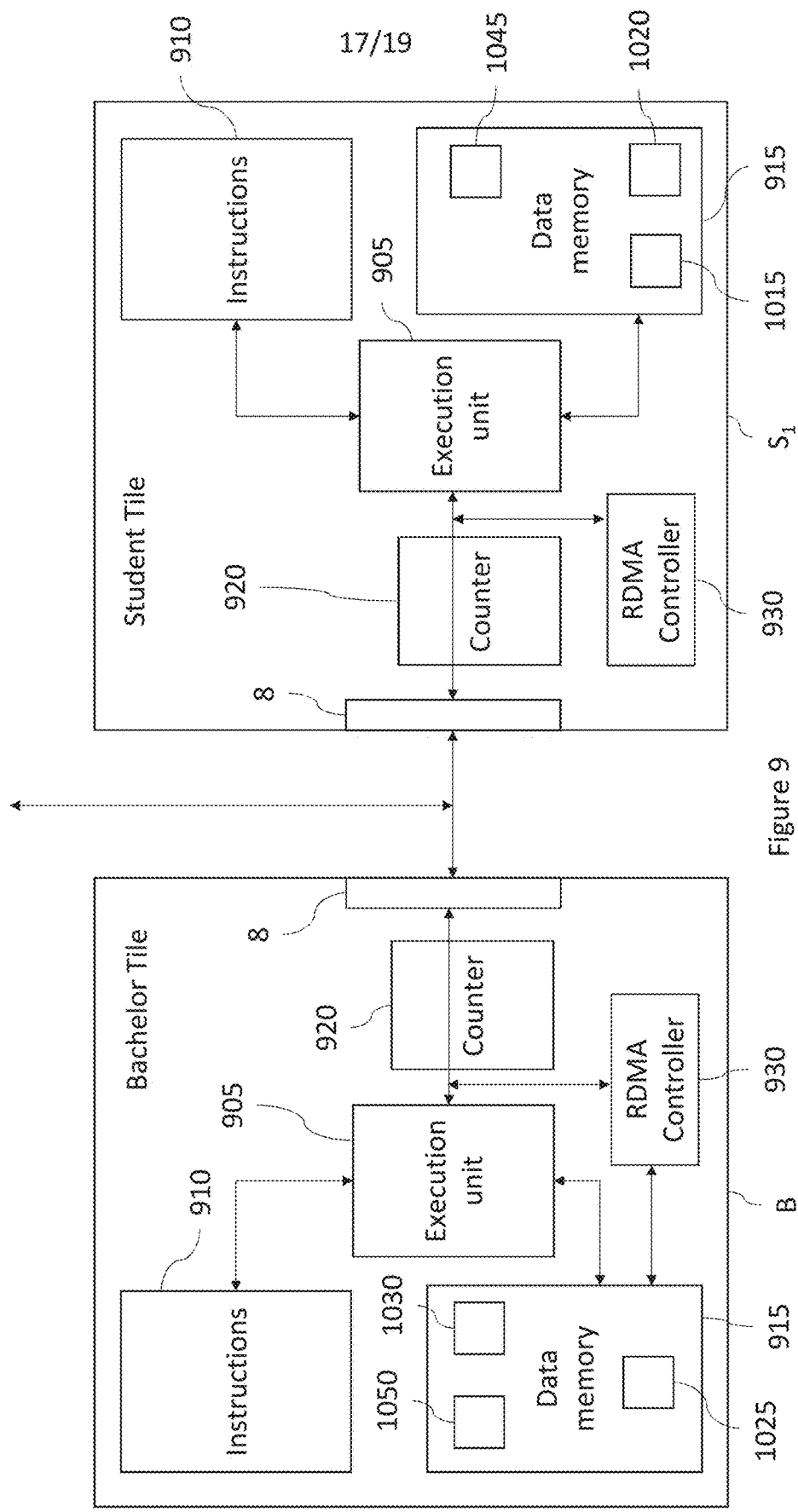
FIG. 9 illustrates the use of counting circuitry for controlling data transfer between tiles.

Reference is made to FIG. 9, which illustrates an example of the tiles B and $S_1$ that are part of a processor 2 illustrated in FIG. 10. The operations shown here as performed by tile B may also be performed by tiles $B_0$ and $B_1$ that are illustrated in FIG. 10A. For reasons of simplification, further tiles, such as tiles M and $S_0$ are not shown. Each of tiles 4 comprises at least one execution unit 905, which may perform arithmetic and logical operations, address calculations, load and store operations, and other operations, as defined by the instructions stored in instruction memory 910. The execution unit 905 is configured to execute the instructions to perform operations on data held in the data memory 915. The instructions held in the instruction memory 910 of each tile 4 may be considered as a subset of the set of instructions held in instruction memory 410 shown for the overall processor 2 in FIG. 4. The instruction memory 410 may be considered to be a distributed memory comprising the instruction memory 910 of each tile 4.

Each of the tiles 4 comprises counting circuitry 920, which is operable to, when appropriate, count the amount of data received at the tile 4. The precompiled computer code in the instruction memory 910 comprises an indication of the number of bytes to be received at bachelor tile B during a particular stage of the data exchange process. The instruction memory 910, for example, stores the number of bytes expected to be received for data 1030. A similar indication is stored in the tile $S_1$. This enables the execution unit 905 of tiles B, $S_1$, to poll the counting circuitry 920 to determine when the complete amount of data from both of the neighbouring processors is received.

The student tile $S_1$ receives the data 1020 via interface 8. The counting circuitry 920 counts the amount of data of unit 1020 received over interface 8. The execution unit 905 polls the counting circuitry 920 to determine the amount of data 1020 received and whether the data 1020 is received. In response to determining that the data 1020 is received, the execution unit 905 is configured to calculate the data 1045 in dependence upon the data 1020, and store the data 1045 in memory 915.

The student tile $S_1$ is also—either before or after receipt of data 1020—configured to send data 1015 to a tile on a different processor. The RDMA controller 930 may cause the data 1015 to be sent to the other tile. Following the sending of this data, the RDMA controller 930 signals the execution unit 905, which causes the control to be passed to bachelor tile B.

In tile B, the counting circuitry 920 is configured to count the number of bytes of data 1030 received at the tile B over interface 8. The number of bytes counted are the number of bytes of data 1030 which, upon being received, are stored in data memory 915. The execution unit 905 is able to poll the counting circuitry 920 to determine the amount of received data 1030. The execution unit 905 compares this amount to the expected amount stored in the instruction memory 910 and, thereby, determines when the complete item 1030 is received. In response to determining that the data 1030 is received, the execution unit 905 of tile B is configured to calculate the data 1050 in dependence upon the data 1030, and store the data 1050 in memory 915. The tile B is also—either before or after receipt of data 1030—configured to send data 1025 to a tile 4 on a different processor. The RDMA controller 930 may cause the data to be sent to the other tile 4.

Furthermore, in response to determining that the data 1030 is received, the execution unit 905 of tile B is configured to cause the control to be passed to another tile, e.g. student tile $S_2$.

During the subsequent exchange stage, the control will return to student tile $S_1$ During this exchange stage, the student tile $S_1$ will send the data item 1045, which was computed in dependence upon the data item 1020, to a different tile on a different processor. Similarly, during the subsequent exchange stage, the control will return to bachelor tile $B_1$. The bachelor tile B will send the data item 1050, which was computed in dependence upon the data item 1030, to a different tile on a different processor.

In some embodiments, the execution unit 905 is configured to switch between processing different worker threads. The execution unit 905, in this case, is part of a barrel-threaded processor as described in U.S. patent application Ser. No. 15/886,315. In this case, each worker thread is programmed to perform the computations associated with a respective individual one of the processors in a machine intelligence graph. In this case, at least some of the edges between processors correspond to the exchanges of data between threads. The threads between which data is exchanged may be threads running on the same execution unit 905 or may be threads running on execution units of different tiles 4. Some may involve exchanges between different tiles of the processor 2. The slices shown in memory 915 may each correspond to a delta value associated with a particular edge between processors, with the delta values being calculated by the execution unit 905 during training. The memory 915 is also shown as including further data. This further data may include data for producing the delta values, such as the training data, the current values of the weights and any further data defining the machine learning model, such as activation functions, number of processors in each layer, etc.

It will be appreciated that the above embodiments have been described by way of example only.

The invention claimed is:

1. A data processing system comprising a plurality of processors, wherein a first processor of the plurality of processors comprises at least one circuit configured to perform data transfer operations during each of at least some of a plurality of exchange stages, wherein for the first processor, the at least one circuit is configured to:
perform data transfer operations to transfer outgoing data to one or more others of the processors during a first of the exchange stages;
receive incoming data from the one or more others of the processors during the first of the exchange stages;
determine further outgoing data in dependence upon at least part of the incoming data, including reducing at least part of the incoming data with data stored in memory of the first processor and implementing a reduce-scatter collective comprising transferring data determined in dependence upon data received at the first processor in a preceding stage from at least one other of the processors;
count an amount of at least part of the incoming data received during the first of the exchange stages from the one or more others of the processors;
withhold performing data transfer operations to transfer the further outgoing data until the amount of the at least part of the incoming data received has reached a predefined amount; and
in response to determining, based on the count, that the amount of the at least part of the incoming data received has reached the predefined amount, perform the data transfer operations to transfer the further outgoing data to the one or more others of the processors during a second of the exchange stages;
wherein the at least one circuit comprises:
counting circuitry configured to perform the counting an amount of the incoming data received during the first of the exchange stages; and
an execution unit configured to execute computer readable instructions to: poll the counting circuitry to determine the amount of the incoming data received and determine that the amount of the incoming data received has reached the predefined amount.

2. The data processing system of claim 1, wherein for the first processor, the at least one circuit is configured to:
prior to the determining that the amount of the at least part of the incoming data received has reached the predefined amount, perform only some of the data transfer operations to transfer only part of the outgoing data to one or more others of the processors; and
in response to the determining that the amount of incoming data received has reached the predefined amount:
perform remaining data transfer operations to transfer a remaining part of the outgoing data to the one or more others of the processors during the first of the exchange stages; and
subsequently, perform the data transfer operations to transfer the further outgoing data to the one or more others of the processors during the second of the exchange stages.

3. The data processing system of claim 2, wherein for the first processor, the at least one circuit is configured to:
count an amount of a further part of the incoming data received during the first of the exchange stages from the one or more others of the processors; and
following starting to perform the remaining data transfer operations, determine that the amount of the further part of the incoming data received has reached a predefined amount,
wherein the subsequently, perform the data transfer operations to transfer the further outgoing data to the one or more others of the processors during the second of the exchange stages is performed in response to determining that the amount of the further part of the incoming data received has reached a predefined amount.

4. The data processing system of claim 3, wherein the at least part of the incoming data is addressed to a first location in the first processor, wherein the further part of the incoming data is addressed to a second location in the first processor.

5. The data processing system of claim 1, wherein, for the first processor, the one or more others of the processors comprises two or more processors.

6. The data processing system of claim 5, wherein, for the first processor, the two or more processors comprises only two processors.

7. The data processing system of claim 1, wherein the first processor comprises a plurality of processing units configured to:
receive part of the incoming data from the one or more others of the processors; and send part of the outgoing data to the one or more others of the processors;
wherein the steps of counting the amount of incoming data received and determining that the amount of the incoming data received has reached the predefined amount are performed by one or more of the plurality of processing units of a first type.

8. The data processing system of claim 3 wherein the first processor comprises a plurality of processing units configured to:
receive part of the incoming data from the one or more others of the processors; and
send part of the outgoing data to the one or more others of the processors;
wherein the steps of counting the amount of incoming data received and determining that the amount of the incoming data received has reached the predefined amount are performed by one or more of the plurality of processing units of a first type.

9. The data processing system of claim 8, wherein the first processor comprises two of the plurality of processing units of the first type, wherein:
a first of the plurality of processing units of the first type is configured to perform the steps of counting the amount of incoming data received and determining that the amount of the incoming data received has reached the predefined amount,
a second of the plurality of processing units of the first type is configured to perform the steps of counting the amount of the further part of the incoming data received and determine that the amount of the further part of the incoming data received has reached the predefined amount.

10. The data processing system of claim 7, wherein a first processing unit of the plurality of processing units is configured to, subsequent to performing operations to send part of the outgoing data, cause control to pass to a second processing unit of the plurality of processing units for that second processing unit to perform operations to send part of the outgoing data.

11. The data processing system of claim 9, wherein the first processing unit is configured to perform the causing of control to pass in response to determining that an amount of a part of the incoming data received has reached the predetermined amount.

12. The data processing system of claim 1, wherein each of the incoming data, outgoing data, and further outgoing data comprise a set of gradients for weights of a machine learning model.

13. The data processing system of claim 1, wherein the at least one circuit comprises a remote direct memory access engine configured to perform the data transfer operations during each of a plurality of exchange stages.

14. The data processing system of claim 1, wherein the plurality of processors are arranged in a ring topology such that the at least one circuit of the first processor is configured to perform the data transfer operations during each of the plurality of exchange stages to transfer data to its two neighbouring processors in the ring, wherein the counting the amount of the incoming data comprises counting an amount of data received from the two neighbouring processors during the first of the exchange stages.

15. The data processing system of claim 1, wherein the at least one circuit comprises at least one of a field programmable gate array or application specific integrated circuit configured to performing the counting of an amount of the incoming data.

16. A method implemented in a first processor of a plurality of processors in a data processing system, the method comprising:
performing data transfer operations to transfer outgoing data to one or more others of the processors during a first exchange stage;
receiving incoming data from the one or more others of the processors during the first exchange stage;
determining further outgoing data in dependence upon at least part of the incoming data, including reducing the at least part of the incoming data with data stored in memory of the first processor and implementing a reduce-scatter collective comprising transferring data determined in dependence upon data received at the first processor in a preceding stage from at least one other of the processors;
counting at least part of the incoming data by counting circuitry;
withholding performing further data transfer operations for a second exchange stage until the at least part of the incoming data received has reached a first amount;
poll the counting circuitry to determine that an amount of the at least part of the incoming data received has reached the first amount; and
in response to determining, based on the counting, that the at least part of the incoming data has reached the first amount, performing the further data transfer operations to transfer the further outgoing data to the one or more others of the processors during the second exchange stage.

17. The method of claim 16, further comprising:
prior to the determining that the at least part of the incoming data received has reached the first amount, performing only some of the data transfer operations to transfer only part of the outgoing data to the one or more others of the processors;
in response to the determining that the at least part of the incoming data has reached the first amount, performing remaining data transfer operations to transfer a remaining part of the outgoing data to the one or more others of the processors during the first exchange stage; and
subsequently, performing the further data transfer operations to transfer the further outgoing data to the one or more others of the processors during the second exchange stage.

18. The method of claim 17, further comprising:
counting a further part of the incoming data received during the first exchange stage from the one or more others of the processors; and
following starting to perform the remaining data transfer operations, determining that the further part of the incoming data received has reached a second amount,
wherein the further data transfer operations during the second exchange stage are performed in response to determining that the further part of the incoming data received has reached the second amount.

19. The method of claim 16, wherein each of the incoming data, the outgoing data, and the further outgoing data include gradients for weights of a machine learning model.

20. The method of claim 16, wherein the determining the further outgoing includes reducing the at least part of the incoming data with data stored in memory of the first processor.

* * * * *